(12) United States Patent  
Hunt et al.

(10) Patent No.: US 8,868,926 B2  
(45) Date of Patent: Oct. 21, 2014

(54) CRYPTOGRAPHIC HASH DATABASE

(75) Inventors: Tad Hunt, Sunnyvale, CA (US); Frank E. Barrus, New Ipswich, NH (US)

(73) Assignee: Exablox Corporation, Sunnyvale, CA (US)

( * ) Notice: Subject to any disclaimer, the term of this patent is extended or adjusted under 35 U.S.C. 154(b) by 148 days.

(21) Appl. No.: 13/441,715

(22) Filed: Apr. 6, 2012

(65) Prior Publication Data

US 2013/0268770 A1    Oct. 10, 2013

(51) Int. Cl.  
*G06F 11/30* (2006.01)

(52) U.S. Cl.  
USPC .......................................................... 713/189

(58) Field of Classification Search  
USPC ............................... 713/189, 168, 161; 726/2  
See application file for complete search history.

(56) References Cited

U.S. PATENT DOCUMENTS

| | | | |
|---|---|---|---|
| 7,043,494 B1* | 5/2006 | Joshi et al. | 1/1 |
| 2005/0081041 A1* | 4/2005 | Hwang | 713/176 |
| 2006/0083247 A1* | 4/2006 | Mehta | 370/395.32 |
| 2008/0133893 A1* | 6/2008 | Glew | 712/220 |
| 2010/0217953 A1* | 8/2010 | Beaman et al. | 711/216 |
| 2013/0086004 A1* | 4/2013 | Chao et al. | 707/690 |

\* cited by examiner

*Primary Examiner* — Jeffrey Pwu  
*Assistant Examiner* — Anthony Brown  
(74) *Attorney, Agent, or Firm* — Carr & Ferrell LLP

(57) ABSTRACT

A method for bursting a hash table of a key-value database comprises receiving a key and a value, traversing trie nodes of the key-value database from a root node to a leaf node by recursively dividing the key into a prefix and a suffix, reaching the leaf node, the leaf node being the hash table, determining that the key is not stored in the hash table, determining that the hash table is not able to store the key and the value, removing the hash table, associating a new trie node with a parent trie node of the hash table, associating two or more new hash tables with the new trie node, moving all keys and associated values from the hash table into one of the two or more new hash tables, and inserting the key and the associated value into one of the two or more new hash tables.

84 Claims, 34 Drawing Sheets

CRYPTOGRAPHIC HASH DATABASE

BACKGROUND

1. Technical Field

This disclosure relates generally to data processing, and more specifically, to methods and systems for generating and managing a cryptographic hash database.

2. Description of Related Art

The approaches described in this section could be pursued but are not necessarily approaches that have been previously conceived or pursued. Therefore, unless otherwise indicated, it should not be assumed that any of the approaches described in this section qualify as prior art merely by virtue of their inclusion in this section.

A trie, or prefix tree, is an ordered tree data structure that is used to store an associative array where the keys are usually strings. Unlike a binary search tree, no node in the tree stores the key associated with that node; instead, its position in the tree defines the key it is associated with. All the descendants of a node have a common prefix of the string associated with that node, and the root is associated with the empty string. Values are normally not associated with every node, only with leaves and some inner nodes that correspond to keys of interest. Tries are very fast tree-based data structures for managing strings in-memory, but are space-intensive.

A burst trie is a trie that uses buckets to store key-value pairs before creating branches of the trie. When a bucket is full, it "bursts" and is turned into branches. A burst-trie is almost as fast as a standard trie but reduces space by collapsing trie-chains into buckets. Another benefit is that a more efficient data structure for small sets of key-value pairs can be used in the bucket, making it faster than a conventional trie. Searching of burst-trie involves using a prefix of a query string to identify a particular bucket then using the remainder of the query string to find a record in the bucket. Initially, a burst tree consists of a single bucket. When a container is deemed to be inefficient, it is burst, and then replaced by a trie node and a set of child bins which partition the original container's strings. Although fast, the burst-trie is not cache-conscious. Like many in-memory data structures, it is efficient in a setting where all memory accesses are of equal cost. In practice however, a single random access to memory typically incurs many hundreds of clock cycles.

Although space-intensive, tries can be cache-conscious. Trie nodes are small in size, improving the probability of frequently accessed trie-paths to reside within cache. The burst-trie however, represents buckets as linked lists which are known for their cache inefficiency. When traversing a linked list, the address of a child can not be known until the parent is processed. Known as the pointer-chasing problem, this hinders the effectiveness of hardware prefetchers that attempt to reduce cache-misses by anticipating and loading data into cache ahead of the running program.

"HAT-trie: A Cache-conscious Trie-based Data Structure for Strings" is a publication by Nikolas Askitis and Ranjan Sinha, which is incorporated herein by reference in its entirety. It describes burst-trie algorithms for variable length strings but does not describe handling of these variable length strings. Additionally, the publication describes algorithms and data structures that are cache conscious but does not provide for improved efficiency of burst-trie algorithms.

Furthermore, none of the existing data structures allow for handling datasets exceeding the size of the available RAM.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are methods and systems for bursting a hash table of a key-value database. In one exemplary embodiment, the method for bursting a hash table of a key-value database may comprise receiving a key and a value associated with the key and traversing trie nodes of the key-value database from a root node to a leaf node by recursively dividing the key into a prefix and a suffix. With every iteration, the key may be attributed a value associated with the suffix and compared to a value of a current node of the key-value database. When the leaf node (which is also a hash table) of the key-value database is reached and it is determined that the key is not stored in the hash table, it may be further determined whether or not the hash table is able to store the key and the value. If it is determined that the amount of the data already stored in the hash table does not allow storing the key and the associated value, the hash table may be removed, a new trie node associated with a parent trie node of the hash table, and two or more new hash tables associated with the new trie node. Thereafter, all keys and associated values from the detached hash table may be moved into new hash tables and the new key and the associated value may be inserted into one of the two or more new hash tables.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed, and this description is not intended to include all such aspects and their equivalents.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Figure 1:
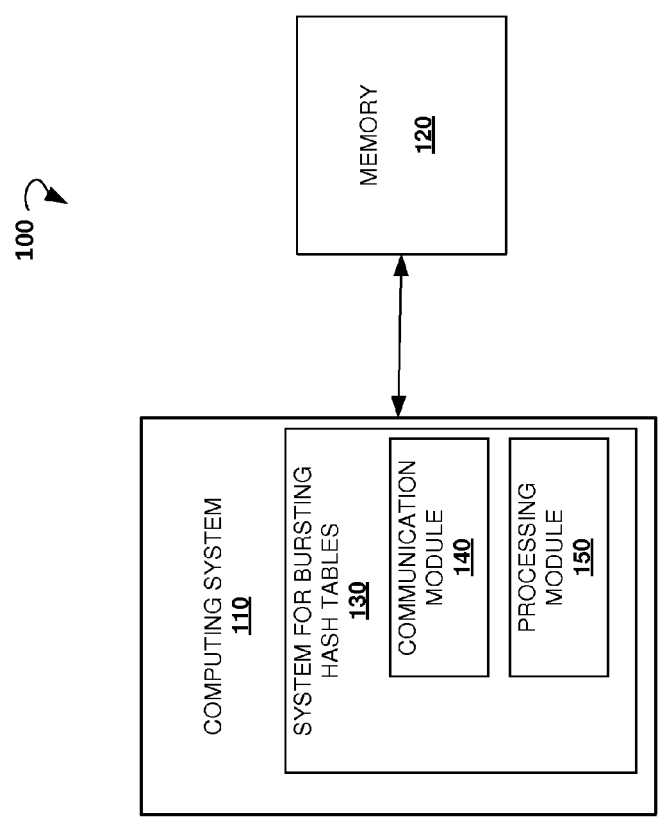
FIG. 1 illustrates a computing environment suitable for implementing methods for managing Hash Database (HDB).

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

The technology described herein allows creating a fast and efficient nonvolatile key-value store, where each key is a fixed length cryptographic hash, and the value is an arbitrary value. The fixed-length hash value is produced by a fixed length cryptographic hash function designed to take a string of any length as input and produce a fixed-length value. The fixed-length cryptographic hash can be derived using a cryptographic hash function that maximizes chances of each fixed length cryptographic hash value to have a unique value. Moreover, in some embodiments, the fixed length cryptographic hash can be derived using a cryptographic hash function that results in a random distribution of hashes, such that there is no obvious grouping of hash values, even if the inputs to the hash function are similar.

A key-value store allows an application to store their data in a schema-less way. The data could be stored in a data type of a programming language or an object. The key-value store processes values opaquely for any external software or applications, and, in general, the key-value store stores whatever value it receives and returns an identical copy of the value when a corresponding retrieving request is received. It should be also mentioned that a single key can have multiple values, such that each value having the same key is stored under a different database root.

A data structure capable of storing and managing large numbers of key-value pairs can be built, where all keys are fixed-length cryptographic hashes, such as, for example, MD5, SHA-1, SHA-2, SHA-3, Tiger, and so forth.

The technology described herein is intended to handle large numbers of keys, not limited by available Random Access Memory (RAM), but rather by space available in an underlying nonvolatile storage device, and to be fast, even when the number of keys far exceeds the available RAM. Some types of non-volatile storage devices include but are not limited to: Hard Drives, Universal Serial Bus (USB) Thumb Drives, Solid State Drives (connected via SATA/SAS/PCIe/etc.), Battery Backed RAM, and so forth. It will be understood that the requirement that the storage device is nonvolatile is not strict and if the non-volatile storage device is replaced with a volatile storage device, the database stored upon it will not survive a power failure.

Various features of the technology described herein include, but are not limited to: storing one or more values associated with a key, retrieving the values associated with a key, removing keys and values from a database, determining if a key is in the database, searching the database for keys within a subrange of all possible keys, sorting the keys, retrieving the keys and values in order, replacing an old value associated with a key with a new value, recovering from failures such as power loss, without loss of data, and detecting corruption introduced by the underlying storage device.

Exemplary Hash Database (HDB) or as also referred herein "key-value databases") data structures (i.e., Trie Nodes and Hash Tables) may include HDB interfaces and algorithms (such as HDB creation and key-value insertion and hash table bursting) and hierarchical cache interfaces and algorithms.

Throughout this document, the term "disk" is used as shorthand for the underlying nonvolatile storage device, and defines an abstract interface that this device provides, namely the ability to load, save, allocate space for, and create persistent handles to the objects that this HDB stores upon it. Once a given HDB operation that creates new objects or modifies existing objects succeeds, the disk is guaranteed to have persisted the changes, so subsequent loads return the last state of each object, even if failure events (such as power fail) occur between the save and the corresponding load. Disk management software is referred to as the Solidstate Allocator. It is described in more detail below.

The HDB and Solidstate Allocator may be utilized with Solidstate storage devices, such as Serial Advanced Technology Attachment SATA-III, or PCIe connected Solid State Drives (SSDs). It will be understood, however, that the technology is not limited to any specific storage device.

As already mentioned above, the technology described herein may allow managing datasets that are much larger than available RAM, and, therefore, may include an efficient caching method as a subsystem. For example, Least Recently Used (LRU) caching algorithm or Hierarchical LRU caching algorithm can be used. The cache operations may be encapsulated, so that the cache methods can change without changing the overall process flow, or high-level HDB methods.

As used herein, an HDB is database that stores and retrieves values associated with cryptographic hashes. An LRU Cache is modeled throughout this document as a queue which is sorted in order of least recently used at the head, and most recently used at the tail. Length(x) is a number of elements in the x queue.

The Queues (LRU Cache) can be defined as follows:

| | |
|---|---|
| x = q.head( ) | Return the first item in q, without removing it |
| x = q.dequeue( ) | Return the first item in q, removing it in the process |
| q.enqueue (x) | append x as the last item in q |
| q.remove(x) | remove x from q, regardless of its position |
| length(q) | the number of elements in the q queue |

Furthermore, as used herein, a disk address is an opaque address provided by the disk. The last data written to this address is guaranteed to be returned in a subsequent read operation, even after a power cycle.

The following provides the detailed description of various embodiments related to methods and systems for generating and managing hierarchical data structures.

Referring now to the drawings, FIG. 1 illustrates a computing environment 100 suitable for implementing various methods for managing the HDB. The computing environment 100 may comprise a computing system 110 and a memory 120. In general, the computing system 110 and the memory 120 are coupled together and are able transmit data to each other. In some embodiments, the computing system 110 and the memory 120 may be integrated within a single computer or can include interconnected computing resources. The memory 120 can be of any type and may include volatile and non-volatile memory, for example, Read-Only Memory (ROM), Random Access Memory (RAM), Dynamic Random Access Memory (DRAM), Static Random Access Memory (SRAM), NAND flash memory, NOR flash memory, solid-state disk (SSD), Serial Advanced Technology Attachment (SATA) SSD, and so forth.

The computing system 110 includes a system 130 for bursting hash tables of key-value databases. The system 130 for bursting hash tables of key-value databases may include a communication module 140 and a processing module 150. The communication module 140 may receive a key and a value associated with the key and transmits the key and the value associated with the key to the processing module 150 for further processing. The processing module 150 may implement various methods described herein.

Figure 2:
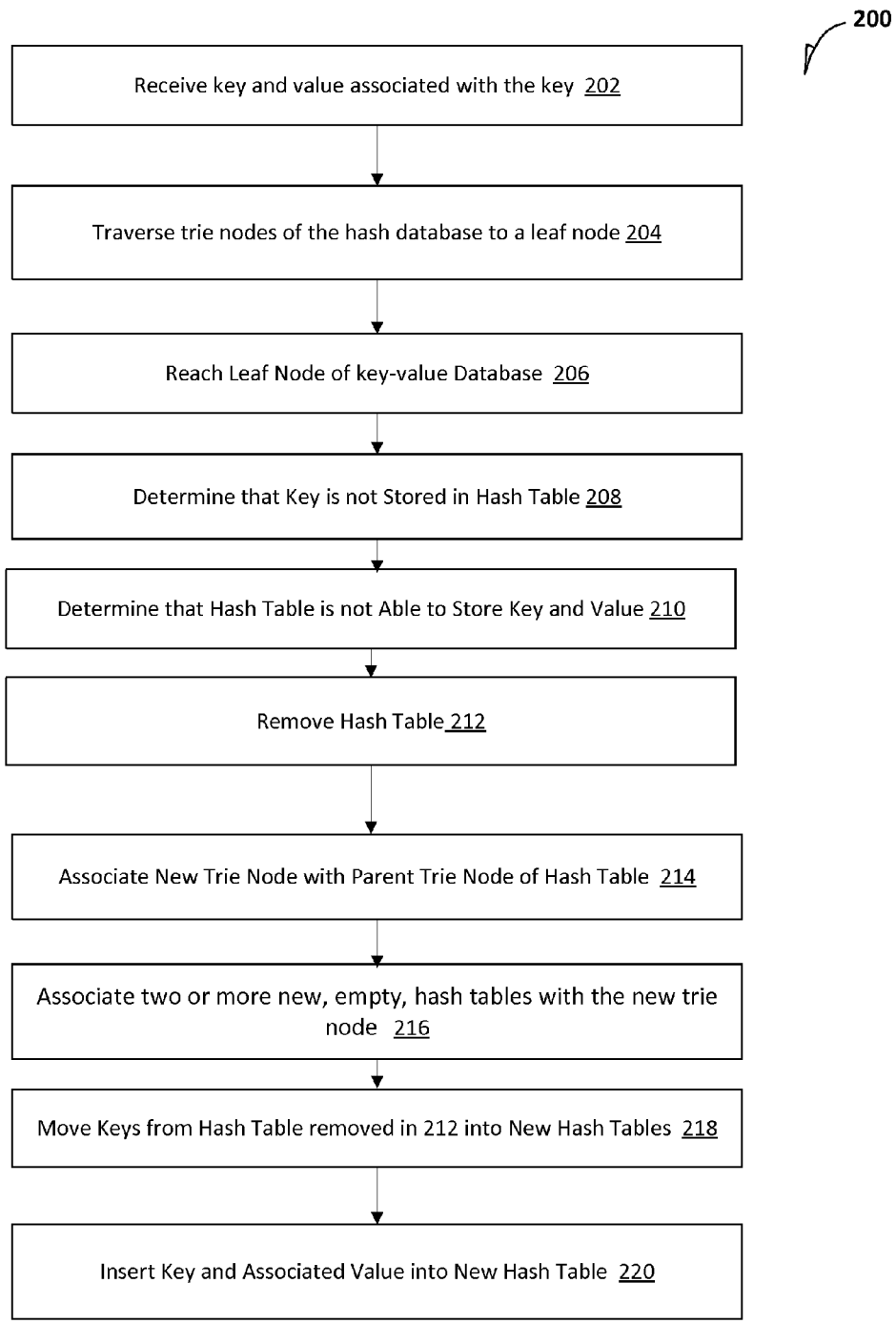
FIG. 2 is an exemplary process flowchart illustrating a computer-implemented method for bursting a hash table of a key-value database.

FIG. 2 is an exemplary process flowchart illustrating a computer-implemented method 200 for bursting a hash table of a key-value database, in accordance with some embodiments. The method 200 may be performed by processing logic that may comprise hardware (e.g., dedicated logic, programmable logic, microcode, etc.), software (such as that which is run on a general-purpose computer system or a dedicated machine), or a combination of both. In one example embodiment, the processing logic resides at the system 130 illustrated in FIG. 1.

The method 200 may commence at operation 202 with the communication module 140 receiving the key and a value associated with the key and proceeds, at operation 204, with the processing module 150 traversing trie nodes of the key-value database from a root node to a leaf node (which contains a hash table) by recursively dividing the key into a prefix and a suffix. At operation 206, the leaf node of the key-value database that is a hash table may be reached. At operation 208, it may be determined that the key is not stored in the key-value database. The method may then proceed at operation 210 with determining that the hash table is unable to store the key and the value. Once this is determined, the hash table may be removed at operation 212. After the removal, at operation 214, the new trie node may be associated with a parent trie node of the hash table and two or more new hash tables may be associated with the new trie node at operation 216. At operation 218, all keys and associated values may be moved from the hash table removed during operation 212 into the two or more new hash tables. The method may be completed at operation 220 with inserting the key and the associated value into an appropriate new hash table.

Figure 3:
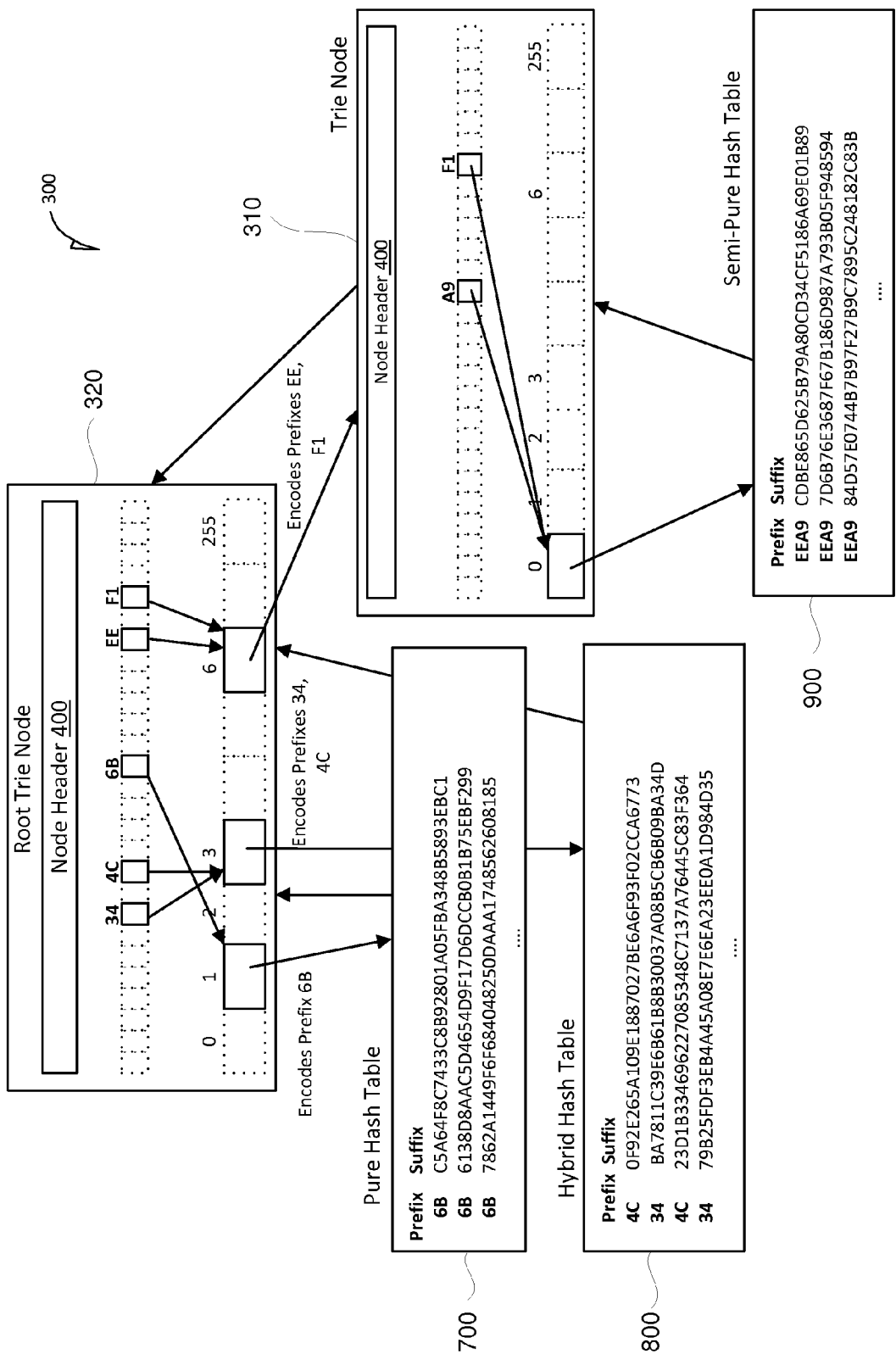
FIG. 3 is a block diagram illustrating an exemplary cryptographic key-value database.

FIG. 3 is a block diagram illustrating exemplary trie nodes and hash tables as well their relationships within an HDB 300. As shown, the HDB 300 may include two types of objects, trie nodes 310 and 320 and hash tables 700, 800, and 900. Hash tables may include three variants, a pure hash table 700, a hybrid hash table 800, and a semi-pure hash table 900. The hash tables 700, 800, and 900, can store a pointer to the parent trie node 320, and key-value pairs, and the trie node 310 and 320 can store pointers to other trie nodes, or to hash tables. As shown in FIG. 3 the trie node 310 stores pointers to hash table 900 and to the trie node 320. The trie node 320 stores pointers to hash table 700, and 800, and a pointer to the trie node 310.

The HDB 300 may provide the ability to insert, search, and remove key-value pairs from the hash tables 700, 800, and 900, while at the same time maintaining the keys sorted in order. The hash tables 700, 800, and 900 can store the actual key-value pairs, and are located at the bottom of the trie structure. Trie nodes do not normally store key-value pairs, they indirectly store key prefixes which are used to find the relevant hash table. Thus, all key-value pairs are stored in leaf nodes which are hash tables.

As mentioned above, the hash table 700 is a pure hash table. There is only a single path to reach the pure hash table 700. This means that all key-value pairs stored in the pure hash table 700 begin with the same prefix ("6B" in this example). A hash table may be pure even if it is empty, as long as there is only one path.

The hash table 800 is a hybrid hash table. There are multiple paths to this node, so it holds key-value pairs where the prefixes are not identical. There must be at least two keys whose prefixes differ, in order for this hash table to be a hybrid. If there are 0 or 1 key-value pairs stored, then this hash table is a Semi-Pure hash table (e.g., the hash table 900).

The hash table 900 is a semi-pure hash table. There are multiple paths to this node, but there are either 0 key-value pairs currently stored here, or all key-value pairs stored here happen to have identical prefixes ("EEA9" in this example).

As shown in FIG. 3, the trie node 320 is a root trie node. The HDB 300 can provide a configurable number of root trie nodes. Each root trie node is an independent database that may share the same underlying permanent storage devices. The number of roots can be configured at initialization time. Roots may also be added or removed at runtime. The keys of the hash tables are fixed length cryptographic hashes.

In contrast to the existing solutions, the technology described herein provides for methods of handling data and data structures that are cache conscious and I/O conscious at the same time. The technology may be deployed atop of certain types of flash memory or atop a generalized permanent storage interface layer that requires no changes in the HDB in order to support different types of nonvolatile memory.

Each hash table in the HDB is configured to be an integral multiple of the minimum disk or flash I/O size (such as 512, 4,096, or 8192 bytes). Each hash table may contain an array hash and each record in the hash table is designed to be an integral multiple of the cache line size. The nodes may be filled and searched using an open addressing, linear probing model. Open addressing is a method of collision resolution in hash tables. With this method, a hash collision is resolved by probing, or searching through alternate locations in the array until either the target record is found, or an unused array slot is found, which indicates that there is no such key in the table. Various probing methods can be used to find the target record, some examples of which include linear probing, quadratic probing, double hashing, multiple hashing algorithm, and so forth. A hash function used to probe the hash table can be taken from a "slice" or segment of the cryptographic hash that is the key. The starting record for the probing is generated by performing the following integer math computation (i.e. no fractional values):

start_record_number=slice_to_integer(key,start,stop) MODULUS (number_of_records)

where "start" and "stop" are the indexes of the start and stop bytes of the key (which is a cryptographic hash), and "slice_to_integer( )" is a type (not value) conversion which is a zero cost operation. Thus, since keys are already cryptographic hashes, just a "slice" or a certain segment of the key itself can serve as the hash value, without computing any new hash over the key. This is one of the advantageous principles of the present technology.

To find a value, an exemplary method can traverse a trie to a key-value pair by looking at the bytes in the hash. Because the prefix of the key is encoded to indicate the path which is traversed to get to the hash table, it can be eliminated from the keys stored in the hash table, thereby leaving more space in the hash table for the values associated with the hash. For performance reasons, the size of each hash table may be equal to an integral multiple of the natural access size of the underlying storage medium (i.e. the flash or SSD page size).

In some exemplary embodiments, a hash table can be allowed to reach a load factor of 100% before bursting. How full the hash table is allowed to reach may be predetermined by a tunable parameter.

Various types of searching can be supported. One exemplary search type includes providing a single hash, with the method returning either FOUND along with the value associated with the hash, or NOT-FOUND if the hash is not in the database. In this case, the sort order of the hash table is not exposed outside of the interface, and accordingly, the internal ordering is irrelevant.

Another exemplary search type includes range matching, with two hashes are provided, "start", and "end", and a callback function. The callback function will be called zero or more times for all of the key-value pairs in the database between start and end. On each call, it will receive at least one key-value pair, but might receive more than one. The key-value pairs may be sent to the callback function partially ordered. Subsequent invocations are guaranteed to be given key-value pairs which come after the key-value pairs given to previous calls. When multiple key-value pairs are sent to an invocation of the callback, there may be no additional ordering guaranteed within that group. The callback function may be handed between 1 and N hashes at a time, where N is capped at the maximum number of key-value pairs in a single hash table.

Figure 4:
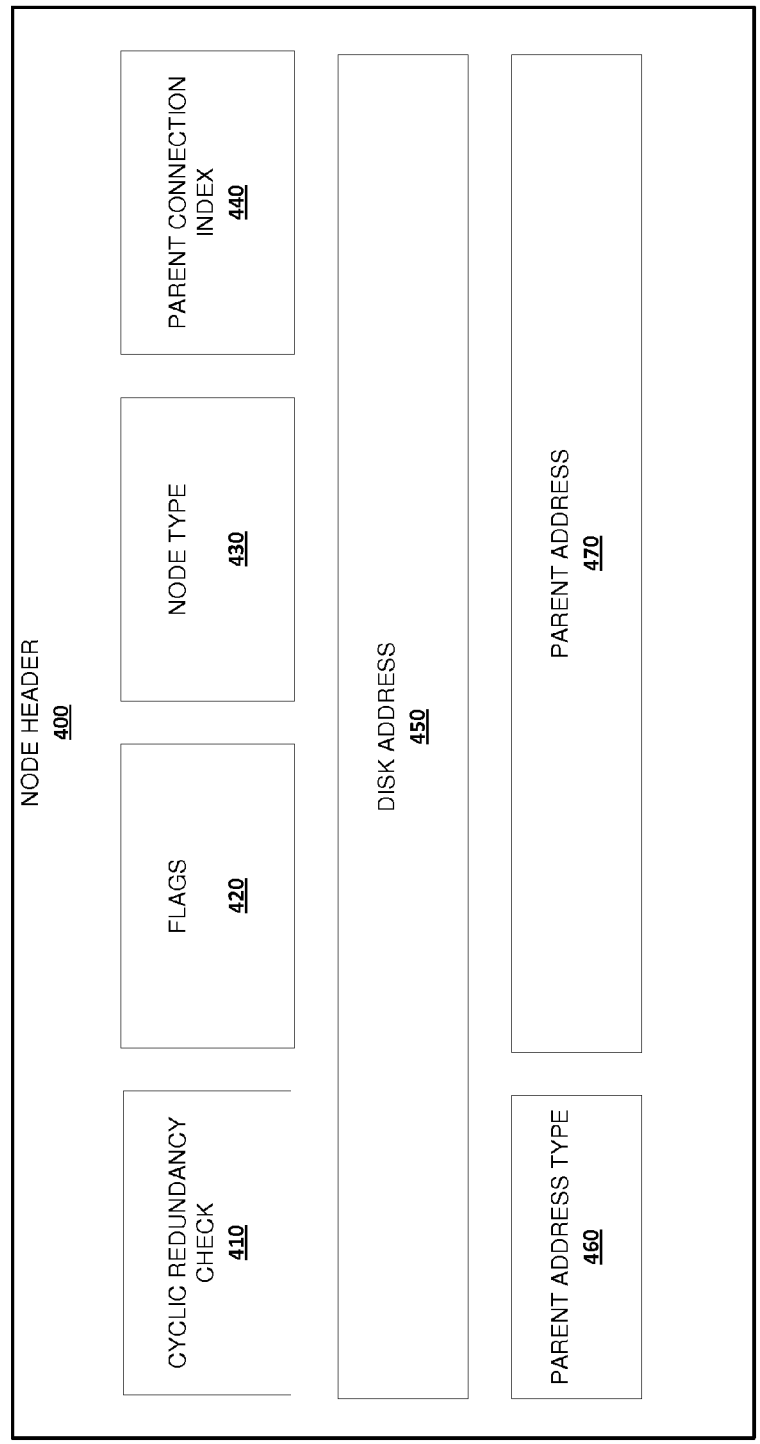
FIG. 4 is a block diagram illustrating an exemplary node header.

FIG. 4 is a block diagram illustrating an exemplary node header 400. Trie nodes and hash tables both begin with the node header 400, which serves to identify the type of the object (trie node or hash table), identify the external storage location of the object, and provide an integrity check mechanism. Additionally, the node header 400 describes the relationship between the object and its parent and tracks extra state associated with the object.

As shown in FIG. 4 the node header 400 may include a CRC (Cyclic Redundancy Check) field 410, a flags field 420, a node type field 430, a parent connection index field 440, a disk address field 450, a parent address type field 460, and a parent address field 470.

The flags field 420 may designate and store various flags such as "dirty", "locked", "cached", "connected", and "is root", which are used for tracking memory caching state. The node type field 430 identifies the containing node as a trie node or a hash table. The parent connection index field 440 may be used to identify which "child address" array entry in the parent trie node points to this node. The disk address field 450 may be used to designate the location on disk storing the data associated with this object. The parent address type field 460 may be used to interpret the parent address field 470, and the parent address type field 460 typically may have one of two values: "in RAM" or "on disk". In the copy of this object that is stored on the disk, the parent address type field 460 is set to "on disk", and the parent address field 470 is set to the parent's disk address. When a copy of this object is stored in RAM, the parent address type field 460 may be set to "in RAM" if the parent trie node is also "in RAM", or "on disk", when the parent is on disk. When a copy of this object is stored in RAM, the parent address field 470 may be set to the parent node's RAM address, when the parent is also in RAM, or the parent's disk address when the parent is not in RAM.

Figure 5:
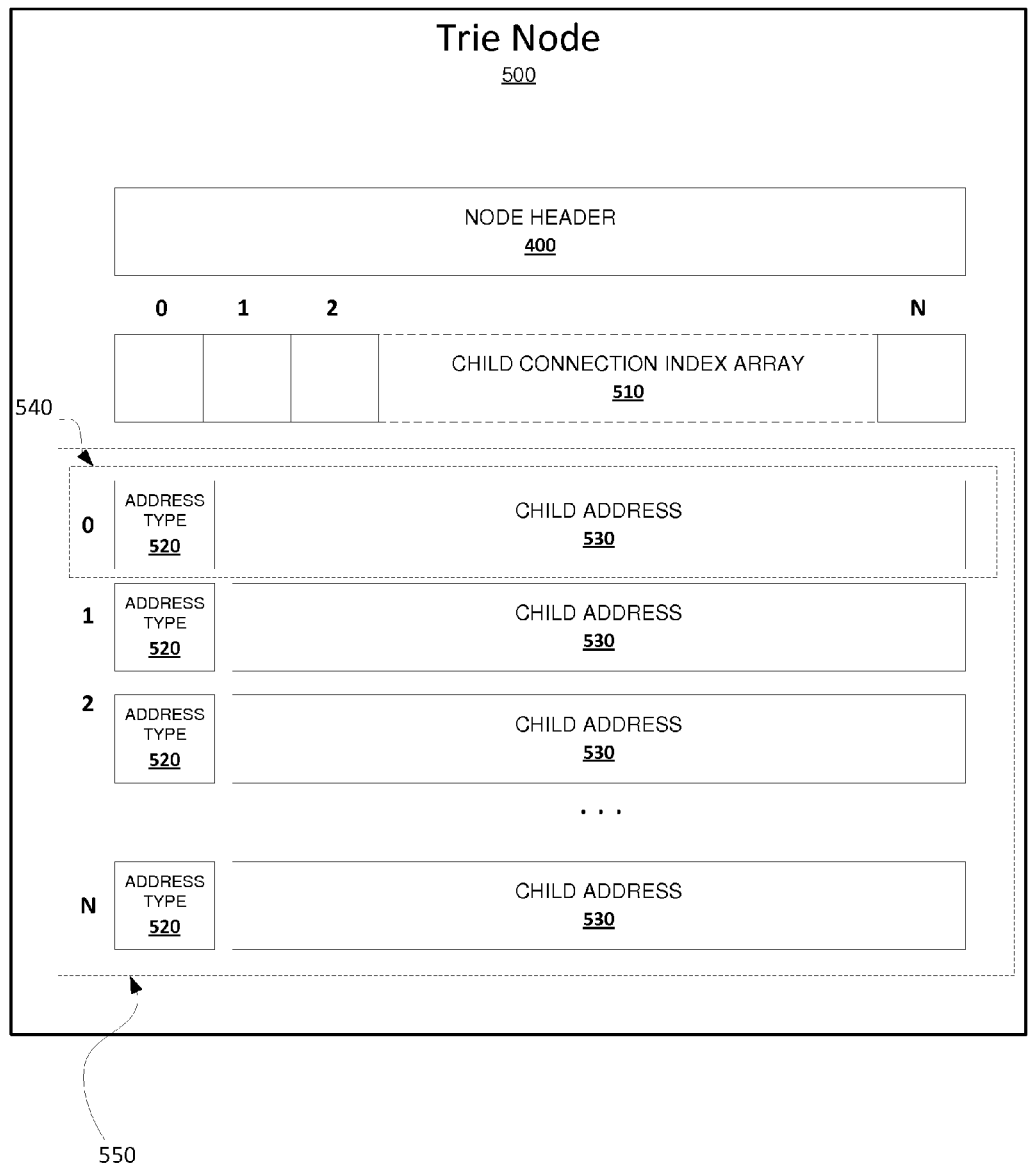
FIG. 5 is a block diagram illustrating an exemplary trie node.

FIG. 5 is a block diagram illustrating an exemplary trie node 500. The trie node is a node that may only decode a N bit prefix of the key only, and where N is selected from 0 to the parameter "length_in_bits_of_the_key" (e.g., from 0 to 256). There can be up to length(Key) levels of trie nodes, where length(Key) is the number of bytes in the key. As shown in FIG. 5, the trie node 500 may include the node header 400 (described above with reference to FIG. 4), a child connection index array field 510, an address type field 520, and a child address field 530. The child connection index array field 510 holds 1 through N indices of child array elements, and is used to convert a key prefix into a corresponding record in the child address array. The child that is pointed to holds all keys with that prefix. If the child is a hash table, many (1 ... N) elements of this array may refer to it, in which case the hash table will hold key-value pairs with all matching prefixes. If the child is a trie node, it can only have a single referral from the child connection index array. In other words, pure hash tables 700 have a single record in the child connection index array field 510 referring to it, while hybrid hash tables 800 and semi-pure hash tables 900 have two or more records referring to them.

The address type field 520 may hold two different values, "on disk" or "in RAM". The disk copy of the node will have the address type field 520 set to "on disk". When the disk copy of the node is in the RAM, the address type field 520 depends on whether the child is in RAM or not. Thus if the child is in the RAM the address type field 520 is "in RAM". If, on the other hand, the address type field 520 is on the disk, the address type field 520 is "on disk".

Each pair of an address type 520 and corresponding child address 530 constructs a child address record 540. The array of child address records can be considered as a child address array 550.

In the copy of the node that is on disk, the child address 530 will be set to the on disk address of the child node. In the copy of the node that is in RAM, the child address 530 may also be set to the child's RAM address, if the child node is also in RAM. Additionally, the child address 530, may hold a special address used to mark the child node as free.

Figure 6:
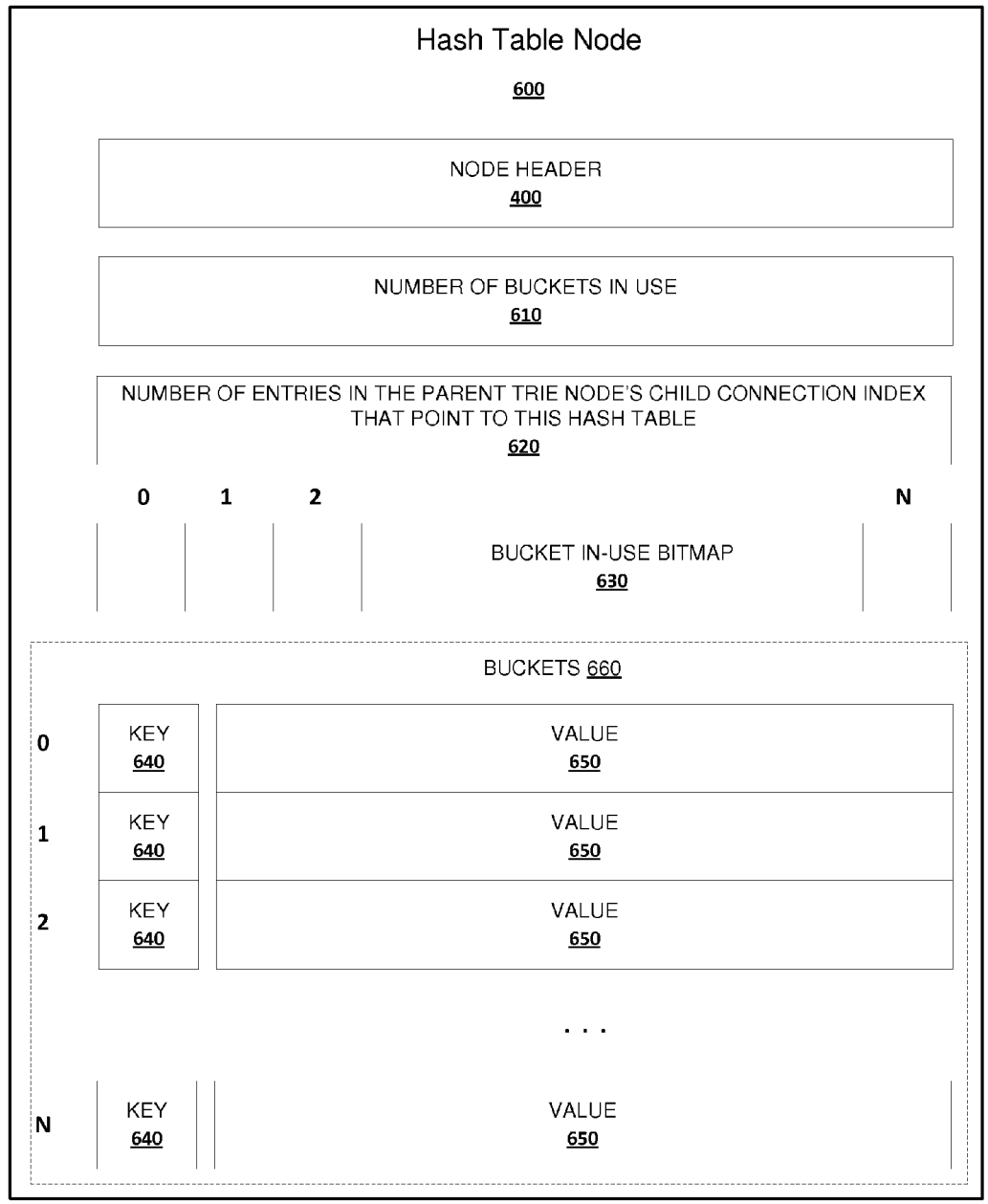
FIG. 6 is a block diagram illustrating an exemplary hash table node.

FIG. 6 is a block diagram illustrating an exemplary hash table node 600. The hash table node 600 is a leaf node and, therefore, does not have any child nodes. The hash table node 600 holds a configurable number of key-value pairs in a cache conscious hash table. As shown in FIG. 6, the hash table node 600 may include the node header 400 (described above with reference to FIG. 4), a number of buckets in use field 610, a field 620 related to a number of entries in the parent's child connection index that point to the hash table node 600, a bucket in-use bitmap field 630, an array of keys 640, and an array of corresponding values 650. The number of buckets in use field 610 refers to a count of hash buckets currently in-use. It may track "fullness" of the hash table for bursting. The field 620 may provide a count of the number of children in the parent trie node that point to this hash table node 600. The bucket in-use bitmap field 630 is a set bit in position i indicates that the bucket i has a valid key and value. A clear bit means that the bucket is empty/available. The keys 640 and the values 650 are parts of corresponding buckets that are stored in the hash table node 600.

Figure 7:
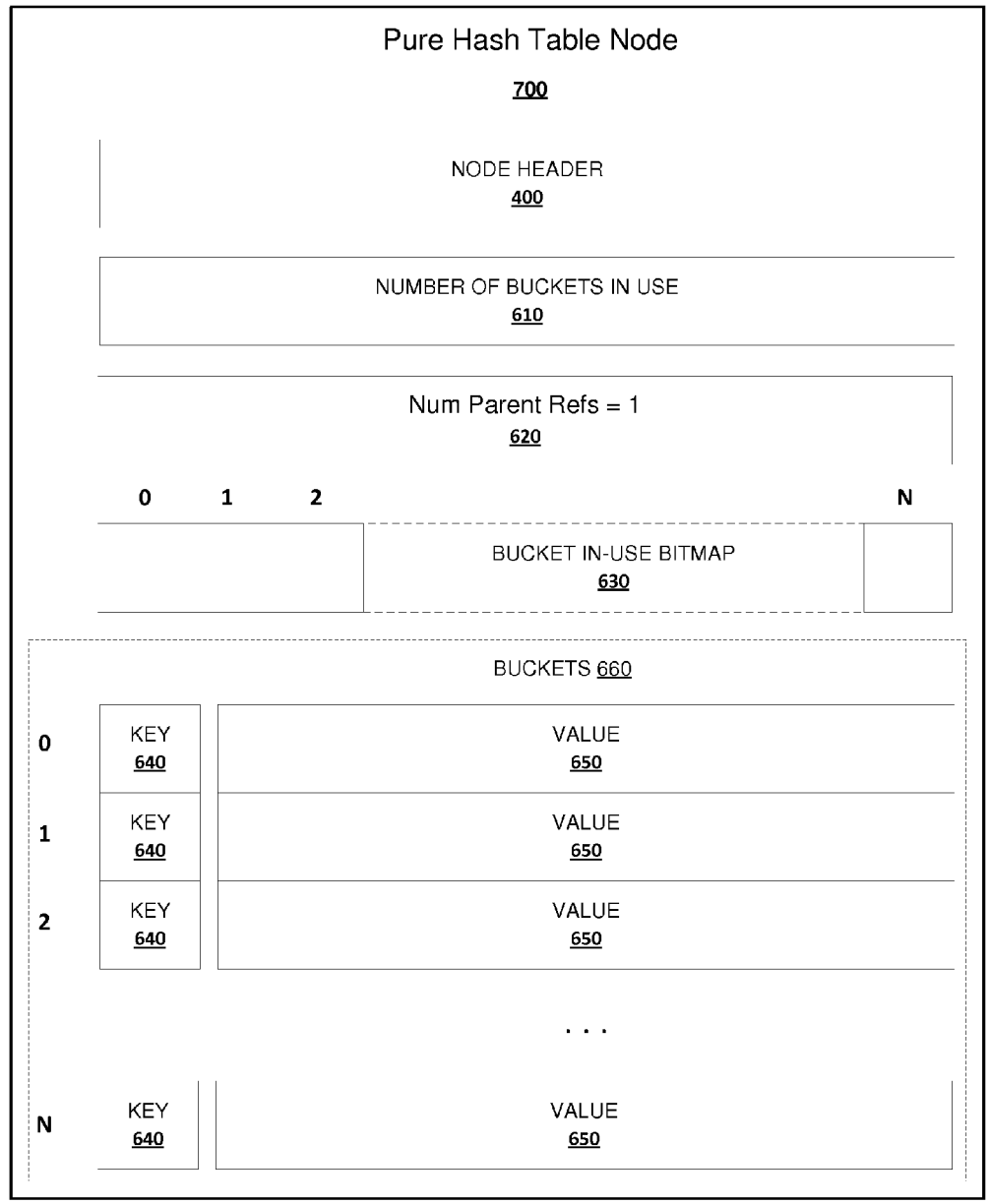
FIG. 7 is a block diagram illustrating an exemplary pure hash table.

FIG. 7 is a block diagram illustrating the exemplary pure hash table 700. As mentioned above, there is only a single path to reach the pure hash table 700. Accordingly, the number of parent references is 1. In other words, the pure hash table 700 is the hash table node 600 where the field 620 is equal to one. Additionally, all key-value pairs stored in the pure hash table 700 begin with the same prefix. Buckets 660 may include 0 to N key-value pairs. The keys may include cryptographic hashes such as, for example, SHA-1, SHA-2, SHA-3, Rabin, and so forth. Corresponding values 0 to N may include opaque data that is associated with a specific key. The HDB 300 may not interpret the values, it simply stores and retrieves them.

The pure hash table 700 may have a number of buckets in use field 610 and a bucket in-use bitmap field 630 similar to that described with reference to FIG. 6.

Figure 8:
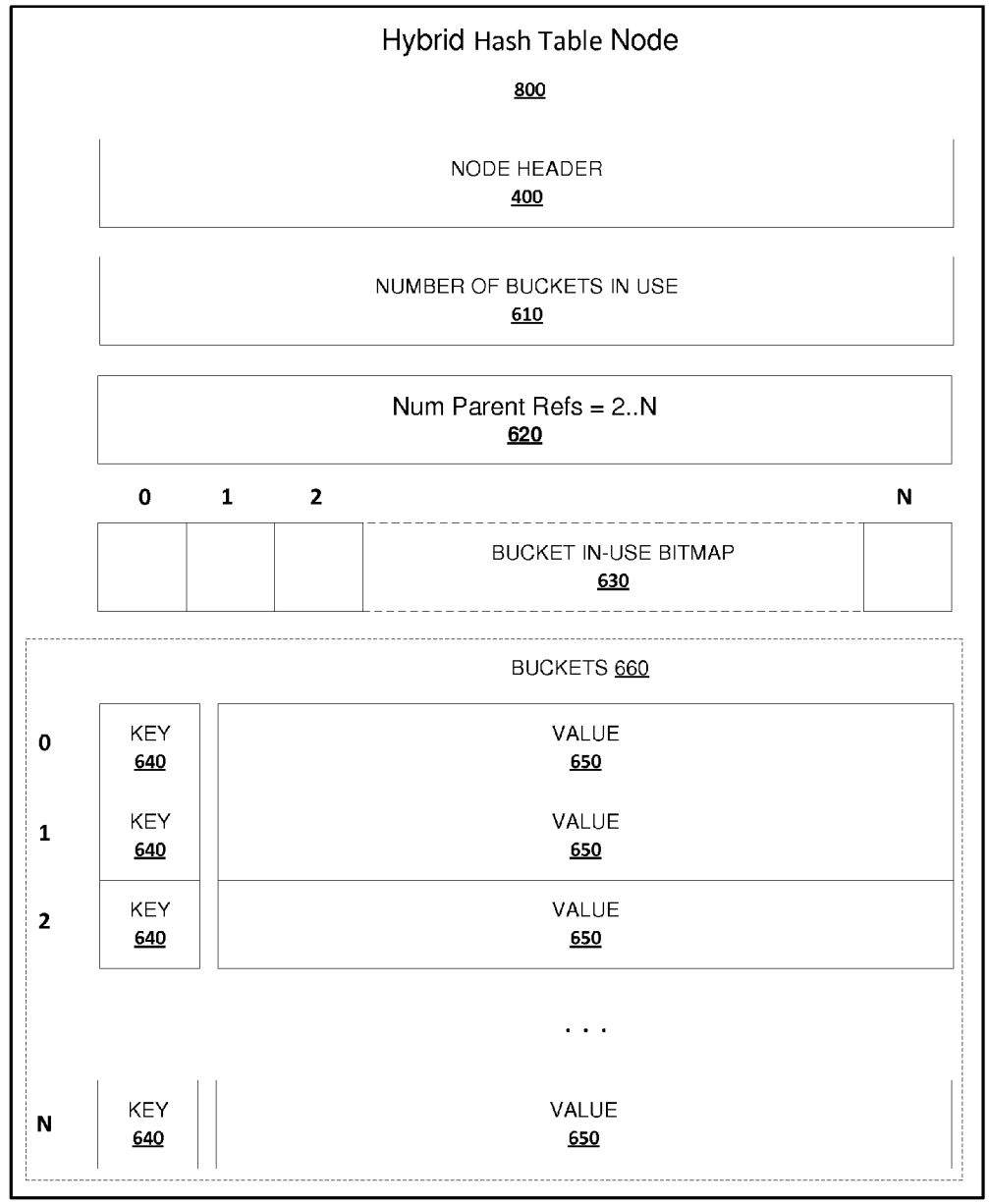
FIG. 8 is a block diagram illustrating an exemplary hybrid hash table.

FIG. 8 is a block diagram illustrating the exemplary hybrid hash table 800. There are multiple paths to the hybrid hash table 800, therefore the number of parent references may be 2 to N. A hybrid hash table 800 is an instance of hash table node 600, where field 620 is equal to 2 . . . N, and it currently holds at least two keys with different prefixes. The buckets 660 include key-value pairs where the last bytes of different prefixes are not identical.

The hybrid hash table 800 may also have a number of buckets in use field 610 and a bucket in-use bitmap field 630 similar to that described with reference to FIG. 6. Furthermore, as mentioned above, all key-value pairs stored in the hybrid hash table 800 may begin with different prefixes. The keys may include cryptographic hashes such as, for example, SHA-1, SHA-2, SHA-3, Rabin, and so forth.

Figure 9:
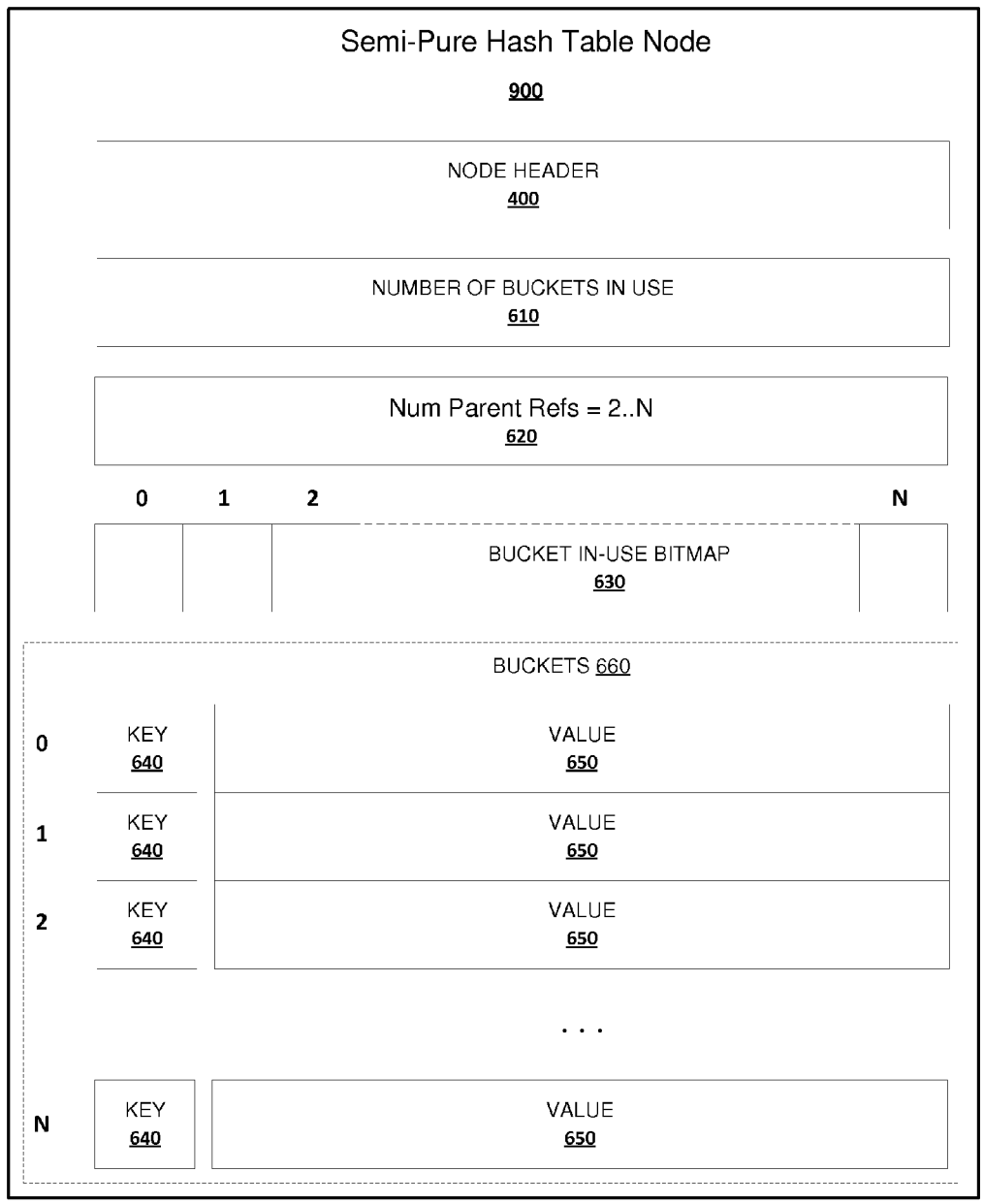
FIG. 9 is a block diagram illustrating an exemplary semi-pure hash table.

FIG. 9 is a block diagram illustrating an exemplary semi-pure hash table 900. There are multiple paths to the semi-pure hash table 900 and therefore, the number of parent references can be from 2 to N. All key-value pairs stored in the buckets 660 must happen to have identical prefixes, otherwise the table would be a hybrid hash table. Similarly, the semi-pure hash table 900 may also have a number of buckets in use field 610 and a bucket in-use bitmap field 630 similar to that described with reference to FIG. 6.

Additionally, all key-value pairs stored in the semi-pure hash table 900 begin with the same prefix.

As mentioned, the keys may include cryptographic hashes. Examples of the cryptographic hashes include SHA-1, SHA-2, SHA-3, Rabin, and so forth.

The semi-pure hash table 900 can be converted to a hybrid hash table 800 as soon as they hold at least 1 key with 2 or more prefixes. When semi-pure hash table 900 holds 0 or 1 keys, it can be converted to a pure hash table 700.

Figure 10:
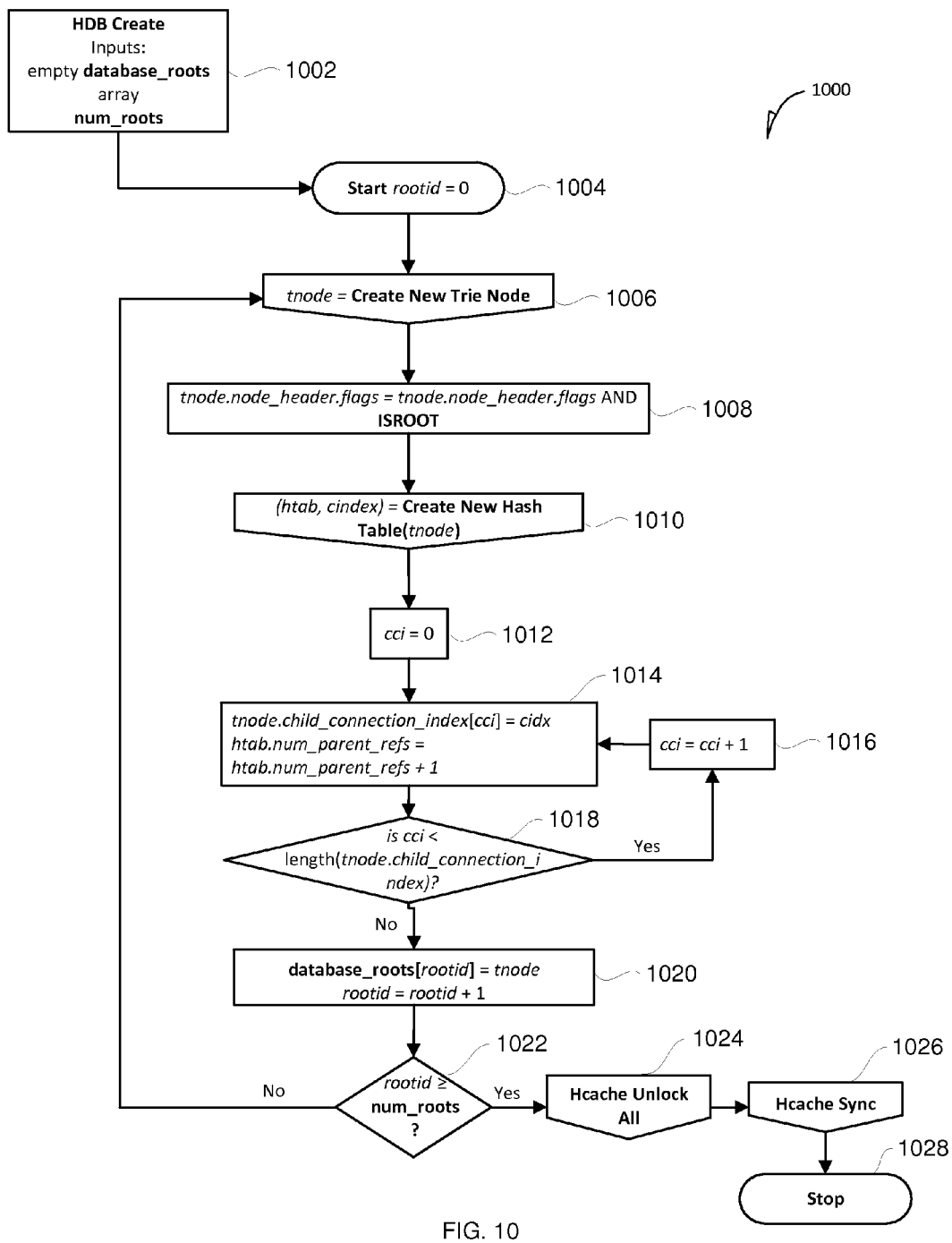
FIG. 10 is a flow chart illustrating creating a new cryptographic key-value database.

FIG. 10 is a flow chart illustrating a method 1000 for creating a new cryptographic key-value database. The method 1000 creates a new, empty, persistent database with the ability to efficiently store, search, modify, and delete large numbers of key-value pairs. The number of key-value pairs is limited only by the size of the underlying permanent storage medium. Each database root can store a single value associated with a key. One of the inputs, a num_roots parameter defines the number of independent keyspaces that a particular HDB instance supports. The method 1000 creates an empty trie node. The method 1000 can divide the key into a prefix and a suffix. The prefix is used to select a child. If the child is a trie node, then the suffix is divided into a new prefix and a suffix, and the selection repeats with the new prefix. When a leaf (which is a hash table) is reached, the method 1000 is terminated. The method 1000 is shown by way of example with reference to operations 1002 through 1028.

Figure 11:
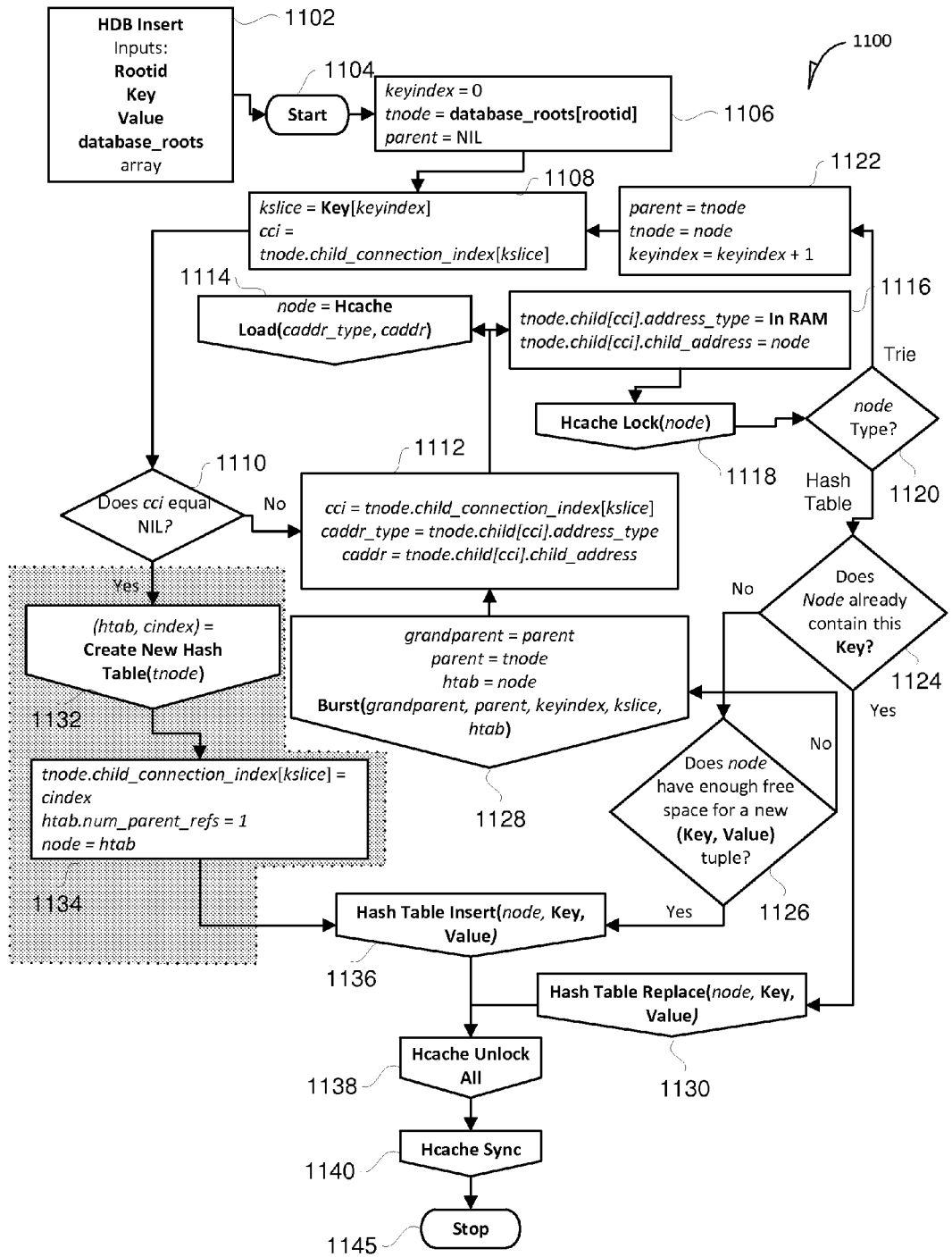
FIG. 11 is a flow chart illustrating inserting a new key-value pair into the HDB.

FIG. 11 is a flow chart illustrating a method 1100 for inserting a new key-value pair into the HDB. The method 1100 may execute until a leaf (which is a hash table) is found. If no hash table is found, a new hash table is created and attached to the proper parent node. Thereafter, the new key-value pair is inserted into the new hash table. The method 1100 may determine whether or not the leaf is a hash table. If the leaf is a hash table, the hash table can be searched. If the key is found, there may be two options, replace the old value with the new value, or return an error. If the key is not found and the hash table has space for a new key-value pair, the method 1100 may insert the new key-value into the hash table. If, on the other hand, the key is not found, and the hash table does not have space for a new key-value pair, the method 1100 may burst the hash table into a new trie node, and two or more hash tables that are children of the new trie node, making sure that that one of the new hash tables is able to fit the new key-value pair.

The burst mechanism mentioned above, may detach the old hash table from the trie, attach the new trie node in its place, create at least 2 new hash tables as children of the new trie node, move the key-value pairs from the old hash table into the correct new hash table, and insert the new key-value pair into the correct new hash table, and free the old hash table. Other HDB methods (e.g., delete and search) are similar. The methods may be complicated by the fact that the dataset does not fit into the available RAM, and so must load into the RAM with the pieces the methods may need to execute a particular operation, while also making efficient use of the limited I/O bandwidth to and TOPS of the storage device. This means keeping an effective cache in the RAM, and also tuning the methods for optimal use of the underlying storage device when the data the methods need either is not already in the RAM, or something must be written out to either make space to read new data in, or because the methods need to guarantee some sort of consistency in the event of power loss. The method 1100 is shown by way of example with reference to operations 1102 through 1145.

Figure 12:
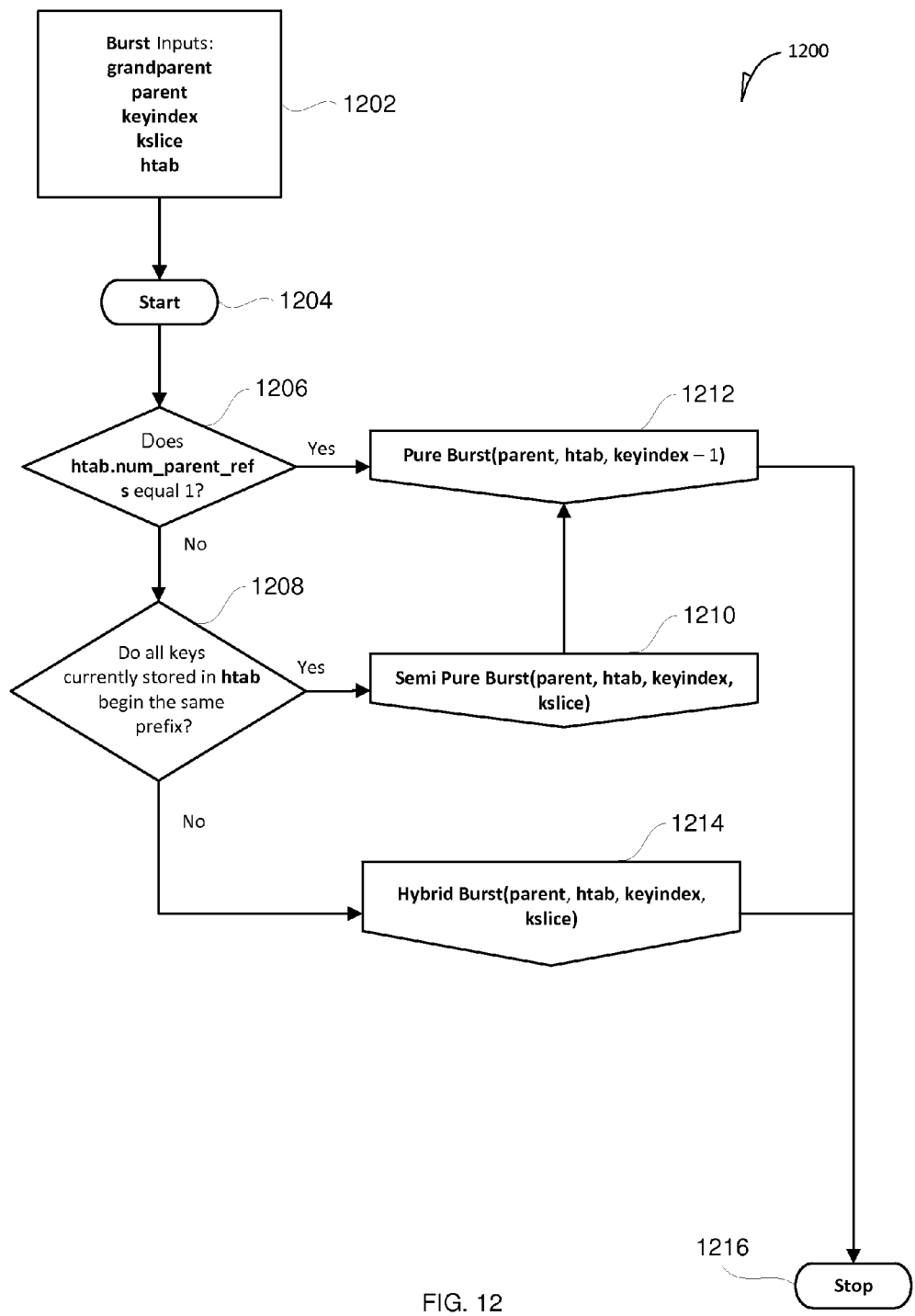
FIG. 12 is a flow chart illustrating a high level bursting algorithm.

FIG. 12 is a flow chart illustrating a method 1200 for high level bursting of HDB. More specifically, the method 1200 is used to burst a trie node as called from operation 1128 on FIG. 11. The method 1200 determines which type of hash table needs to be burst (pure, hybrid, or semi-pure), and call a corresponding algorithm that does the bursting for each hash table type (see FIGS. 13, 14, and 15 and their corresponding description).

It should be noted that the method 1200 is described in a simple form but in actual implementation there may be optimizations that result from a priori knowledge about whether the hash table is a semi pure or hybrid hash table, without a separate search for prefix equality, which may be a resource intensive operation for an uncommon case and therefore is avoided if possible. The method 1200 is shown by way of example with reference to operations 1202 through 1216.

Figure 13:
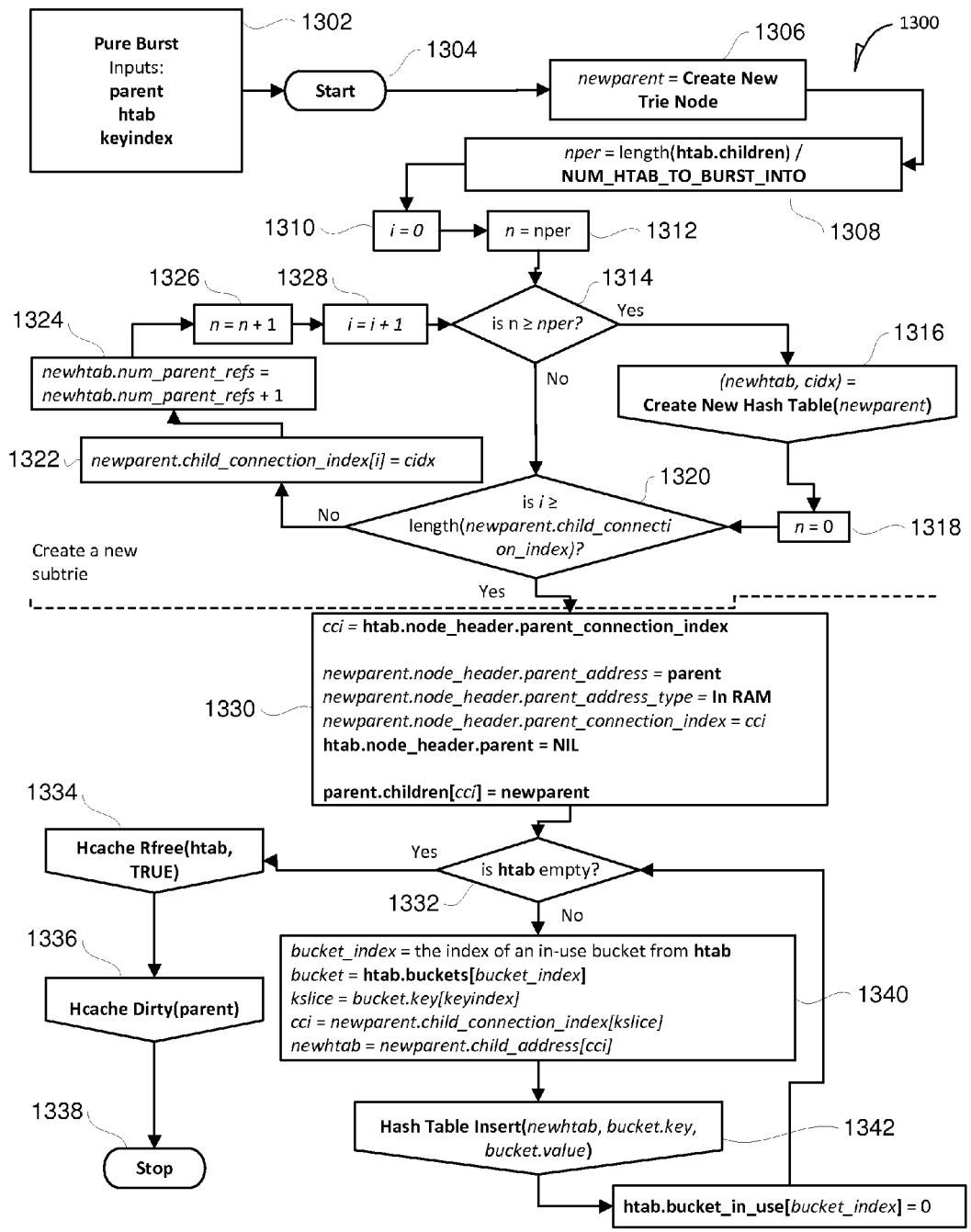
FIG. 13 is a flow chart illustrating bursting of a pure hash table.

FIG. 13 is a flow chart illustrating a method 1300 for pure bursting. As shown, the upper part (up to operation 1330) creates a new subtrie, and the second half (operations 1330 through 1346) disconnects the old hash table, connects the new subtrie in its place, and moves the key-value pairs out of the old hash table into the new subtrie, and finally discards the empty hash table.

After the method 1300 completes, the caller is guaranteed to be able to fit a new key with a matching prefix into the subtrie, as long as the integer parameter "NUM_HTAB_TO_BURST_INTO" shown in block 1308 is greater than one. Note that a parameter can be utilized to change the default sparseness of newly created hash tables, which has an impact on performance and memory and disk utilization. Generally, the method 1300 performs the following operations, disconnect hash table from the parent trie, connect the new subtrie in its place, move all key-value pairs out of the old htab into the new subtrie, and discard the (now empty) hash table. The method 1300 is shown by way of example with reference to operations 1302 through 1346.

Figure 14:
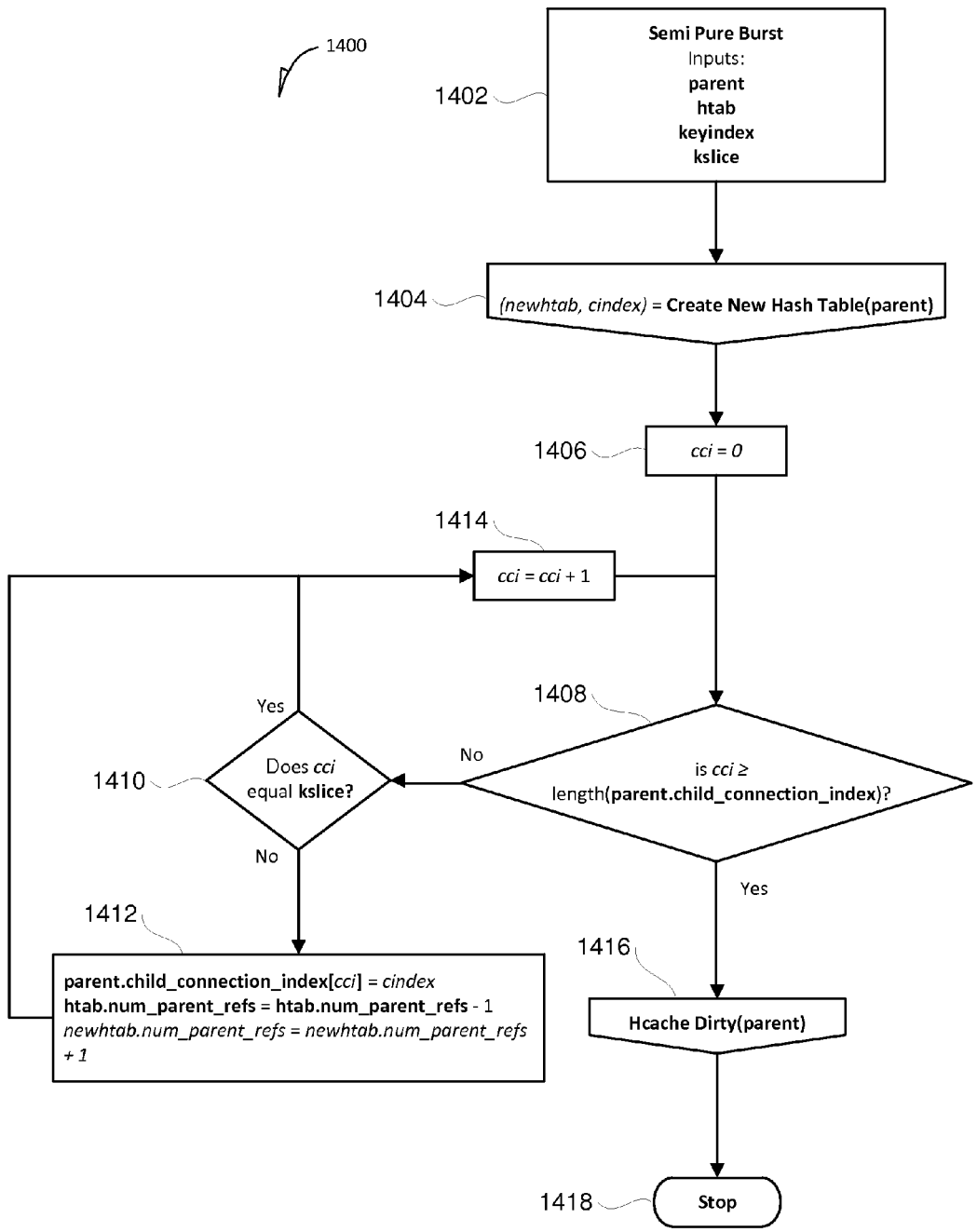
FIG. 14 is a flow chart illustrating bursting of a semi-pure hash table.

FIG. 14 is a flow chart illustrating a method 1400 for semi-pure bursting. At entry, all keys in the hash table have a single prefix, but the parent has this hash table connected to two or more children (that is, it is a destination for at least two different key prefixes, but all of the keys in the hash table all have the same prefix). The method 1400 creates a new hash table, and moves all of the prefixes, except for the single prefix that all of the keys in the hash table begin with, to point to the new, empty, hash table. This converts the hash table into a pure hash table, and the new hash table into either a pure or semi-pure hash table. The method 1400 is shown by way of example with reference to operations 1402 through 1418.

Figure 15:
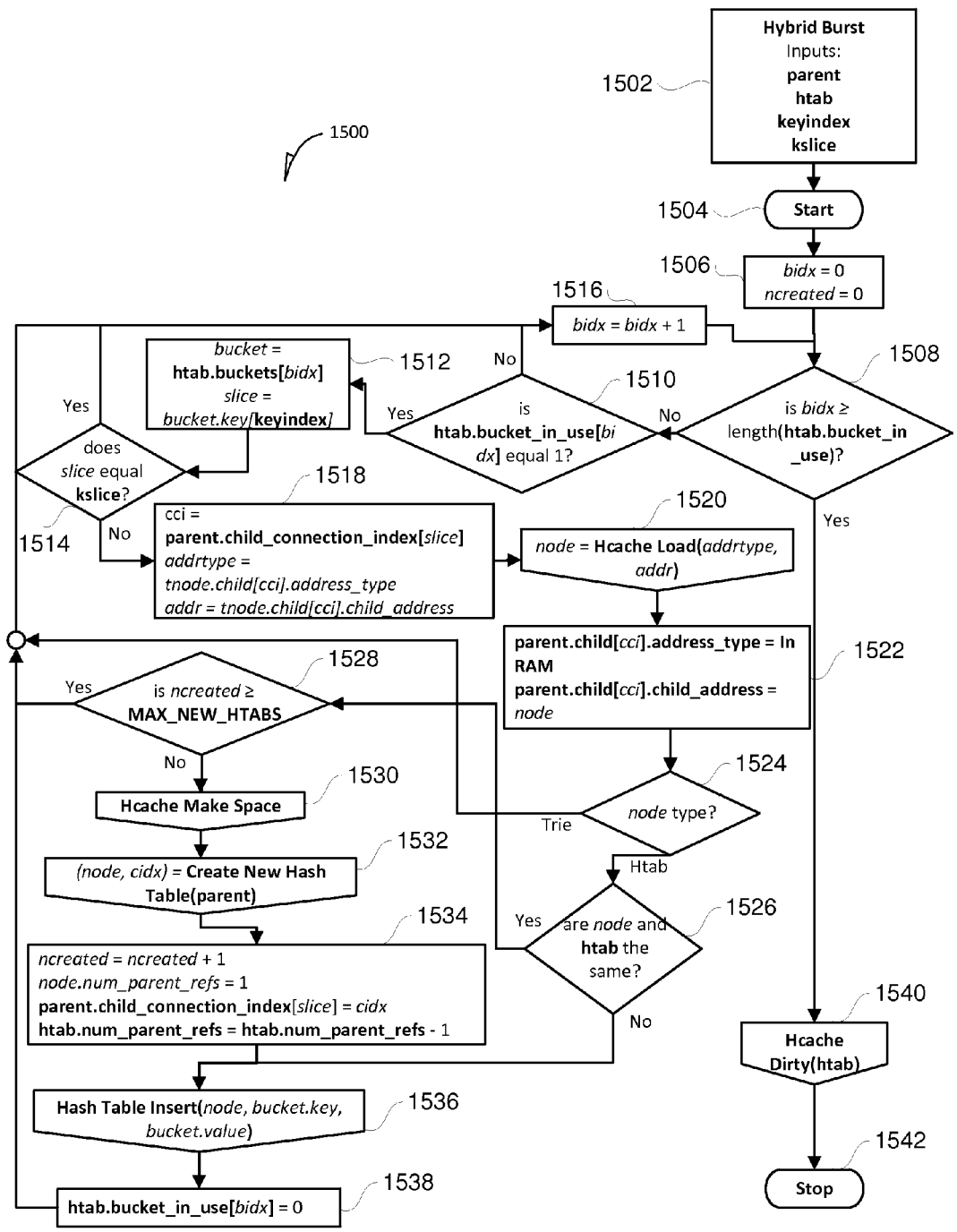
FIG. 15 is a flow chart illustrating bursting of a hybrid hash table.

FIG. 15 is a flow chart illustrating a method 1500 for hybrid bursting. The method 1500 may free up space to put the new key-value pair in the hash table. All keys-value pairs with matching key slice ("kslice") values are kept the hash table while key-value pairs with other kslice values are candidates for removal. The method 1500 as shown may ignore some of more expensive and complex options. For example, if the method 1500 finds a key-value pair with a different kslice, it attempts to create a new pure hash table to move it into, unless it's already created too many. If it would be too expensive to move this key-value pair (perhaps because it would cause another hash table to burst, or a trie traversal), the method 1500 may skip all key-value pairs with such kslice values.

Since a hybrid hash table has at least two children pointing to it, even without the more complex optimizations, creation of at least one new pure hash table to move matching key-value pairs into is guaranteed. The only exception to this rule would occur if the hybrid hash table happens to be full of key-value pairs with identical key prefixes that match the key slice, because the method 1500 will be unable to move them, but note that this situation describes a semi-pure hash table, and is handled as such by the caller (FIG. 12). It should be noted that maximum number of new hash tables is a tunable parameter that affects memory and disk utilization and performance. The method 1500 is shown by way of example with reference to operations 1502 through 1542.

Figure 16:
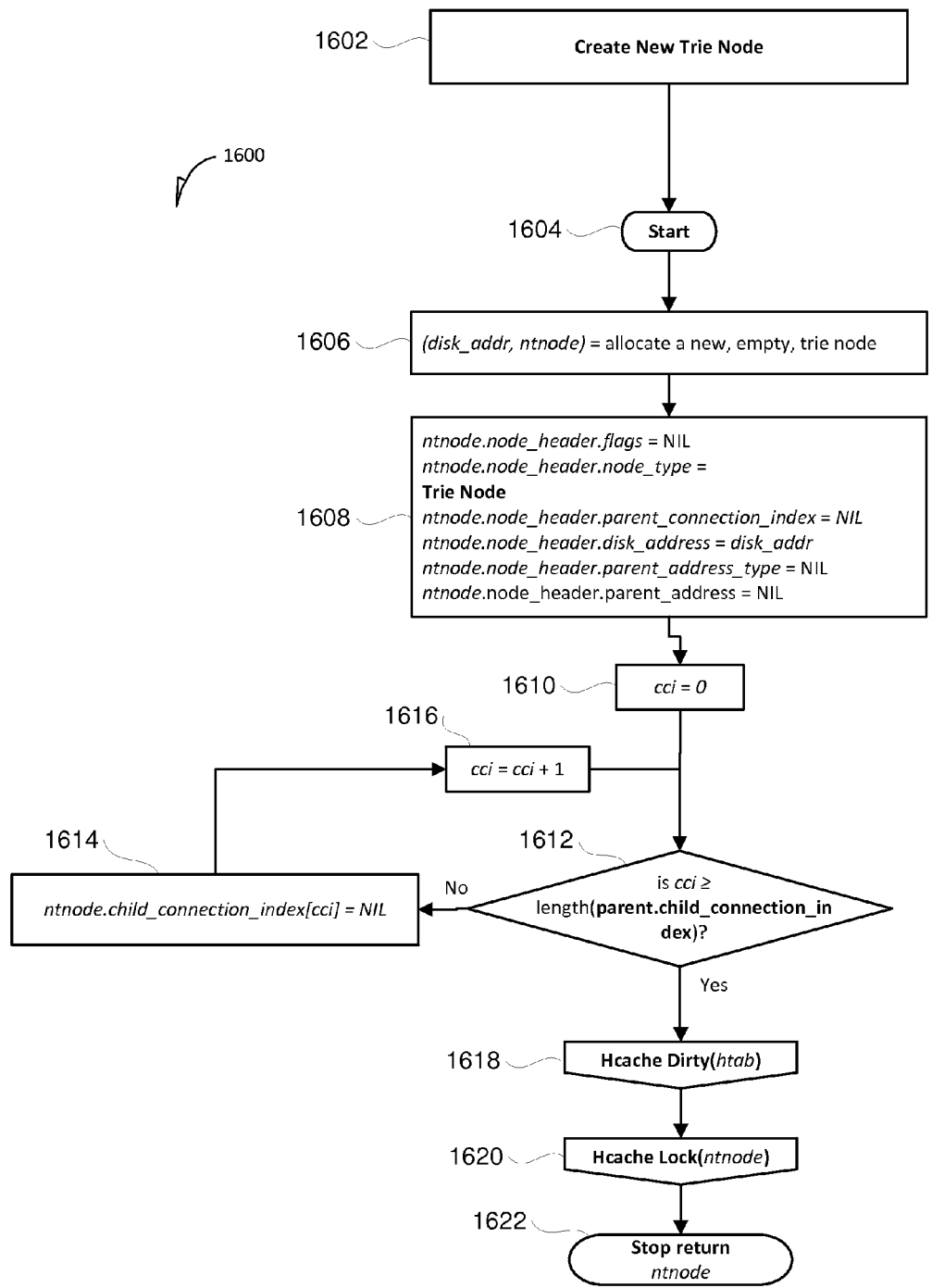
FIG. 16 is a flow chart illustrating creating a new trie node.

FIG. 16 is a flow chart illustrating creating a method 1600 for creating a new trie node, which is empty. The method 1600 is shown by way of example with reference to operations 1602 through 1622.

Figure 17:
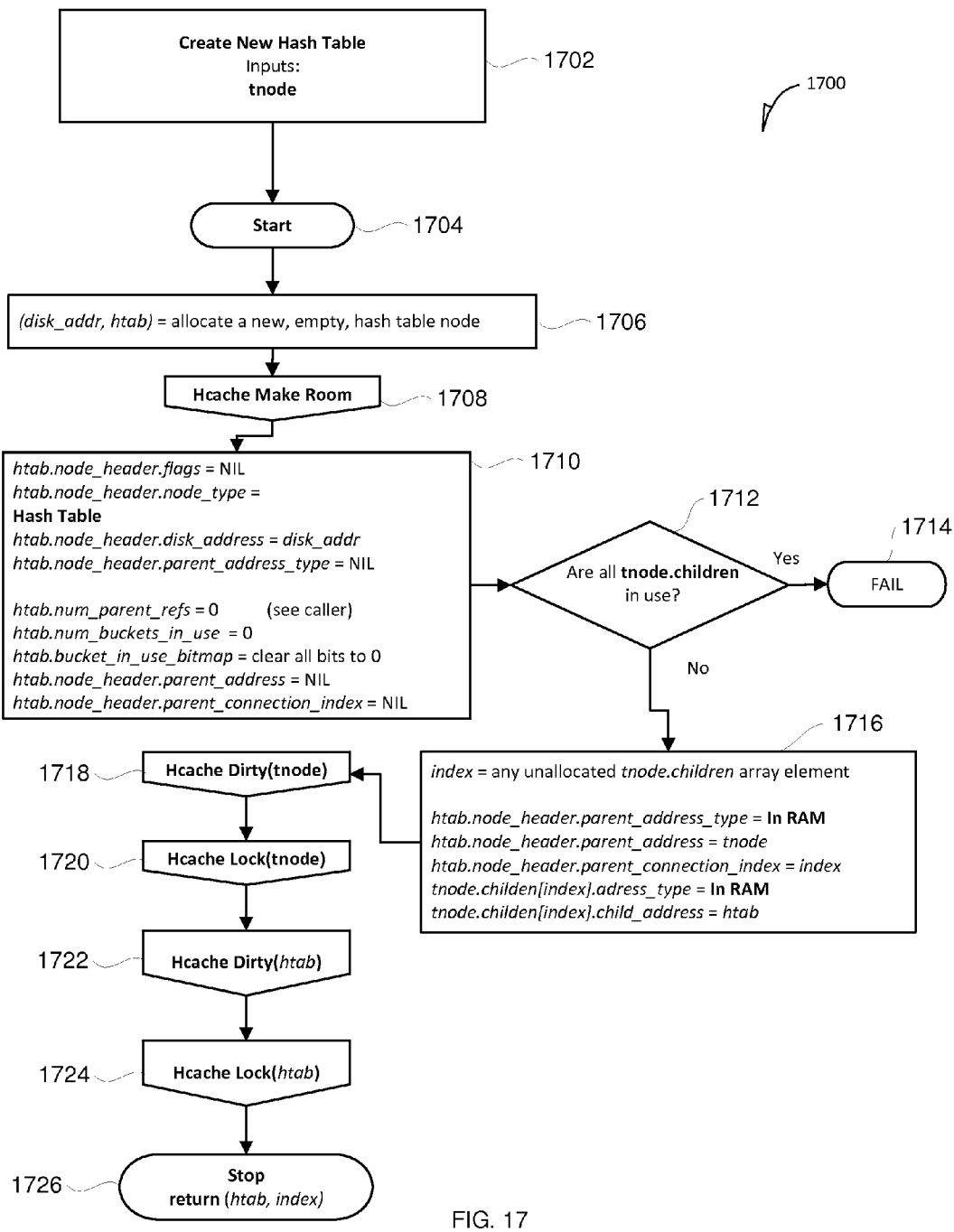
FIG. 17 is a flow chart illustrating creating a new hash table.

FIG. 17 is a flow chart illustrating a method 1700 for creating a new hash table. The method 1700 creates a new, empty, hash table, connected to the given parent trie node. It should be noted that none of the parent's child connection index array elements refer to this new hash table, those connections will be created by the caller. The method 1700 is shown by way of example with reference to operations 1702 through 1726.

Figure 18:
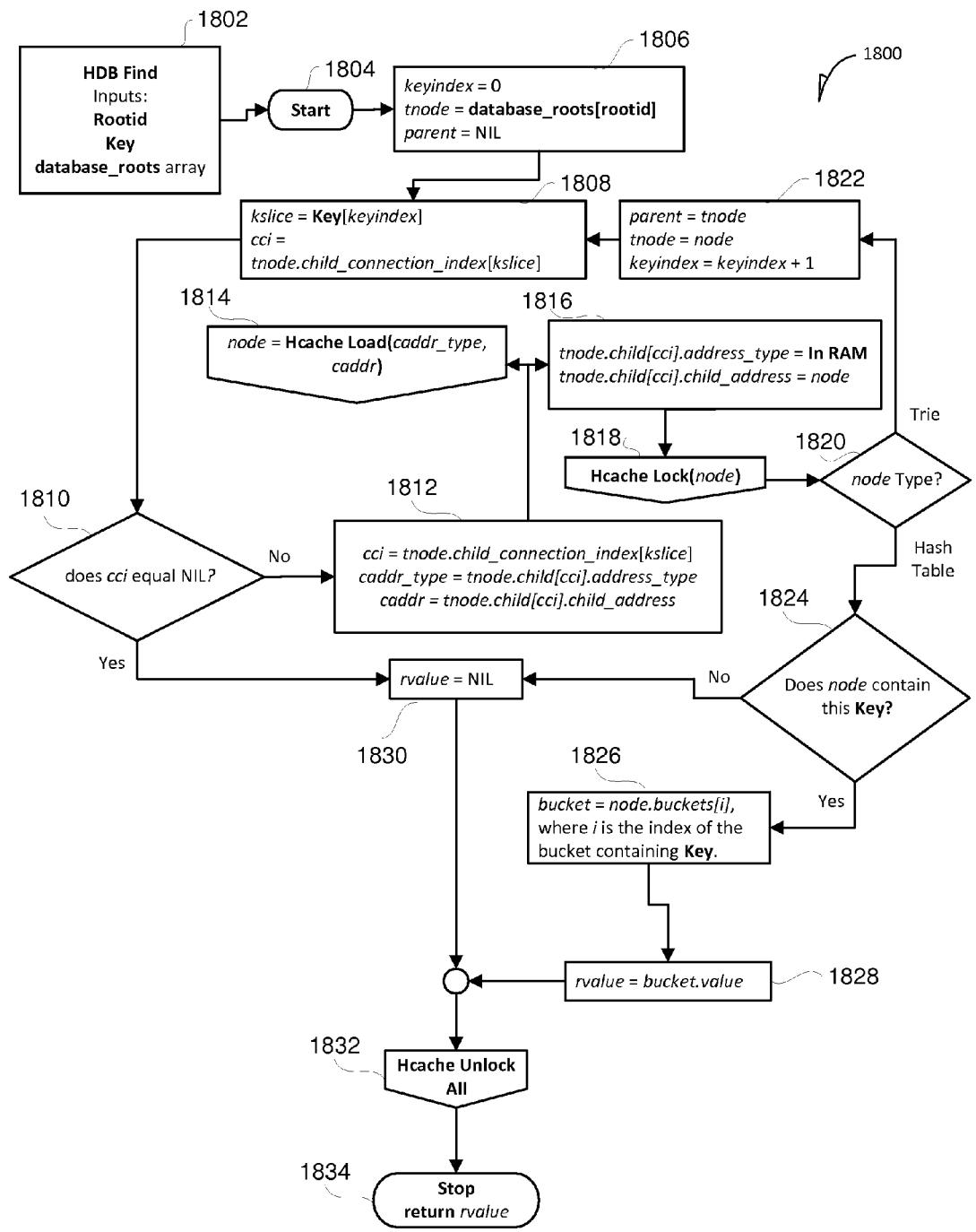
FIG. 18 is a flow chart illustrating a method for determining whether a key exists in the database, and if so the value associated with the key.

FIG. 18 is a flow chart illustrating a method 1800 for determining if a key exists in the database, and if so the value associated with it. That is, if there are multiple database roots, this routine will search a single root and return the value in that root, or NIL if it is not found. The method 1800 is shown by way of example with reference to operations 1802 through 1834.

Figure 19:
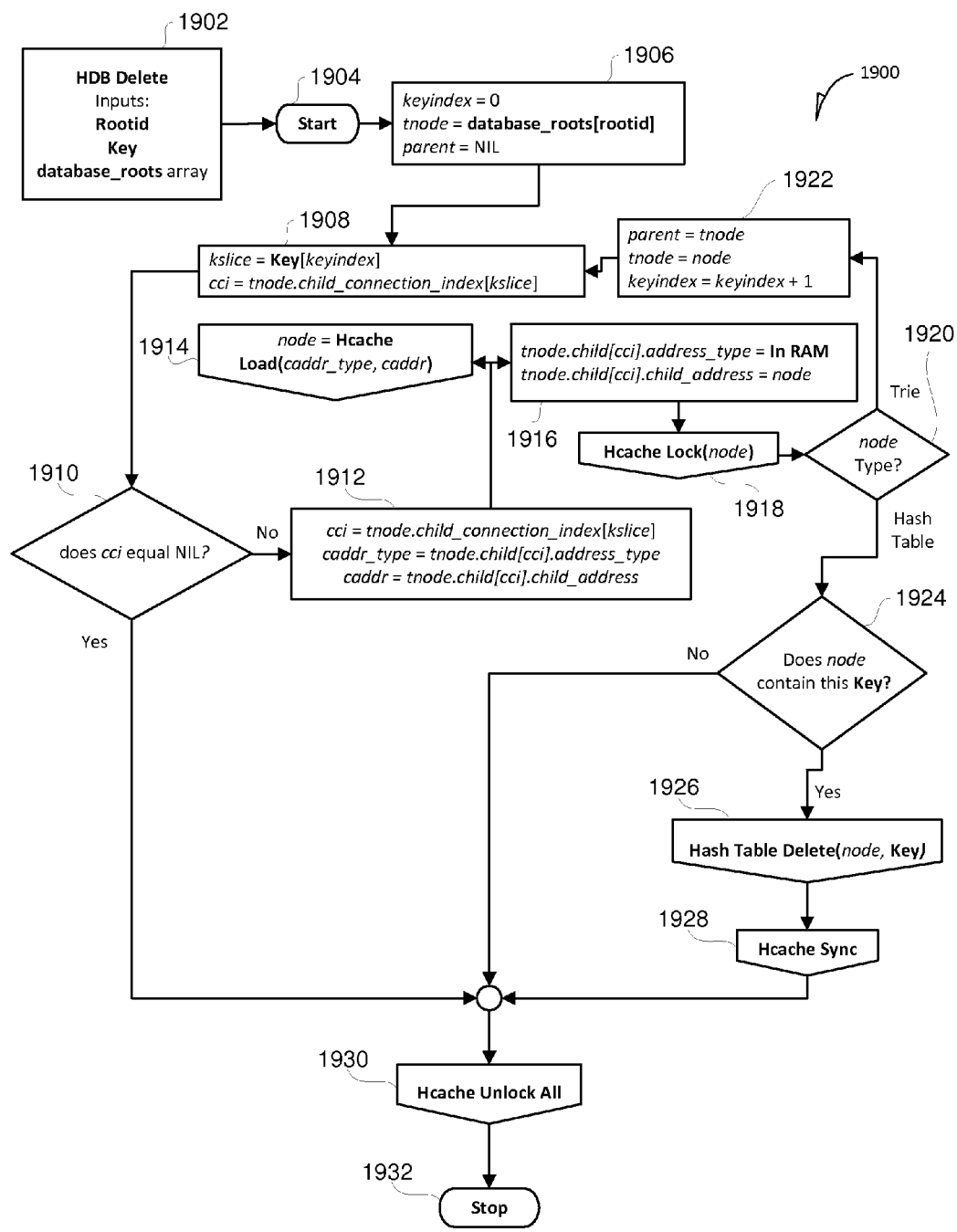
FIG. 19 is a flow chart illustrating a method for deleting a key and its associated value from a hash table.

FIG. 19 is a flow chart illustrating a method 1900 for deletion of a key and its associated value from hash table. The method 1900 is shown by way of example with reference to operations 1902 through 1932.

Figure 20:
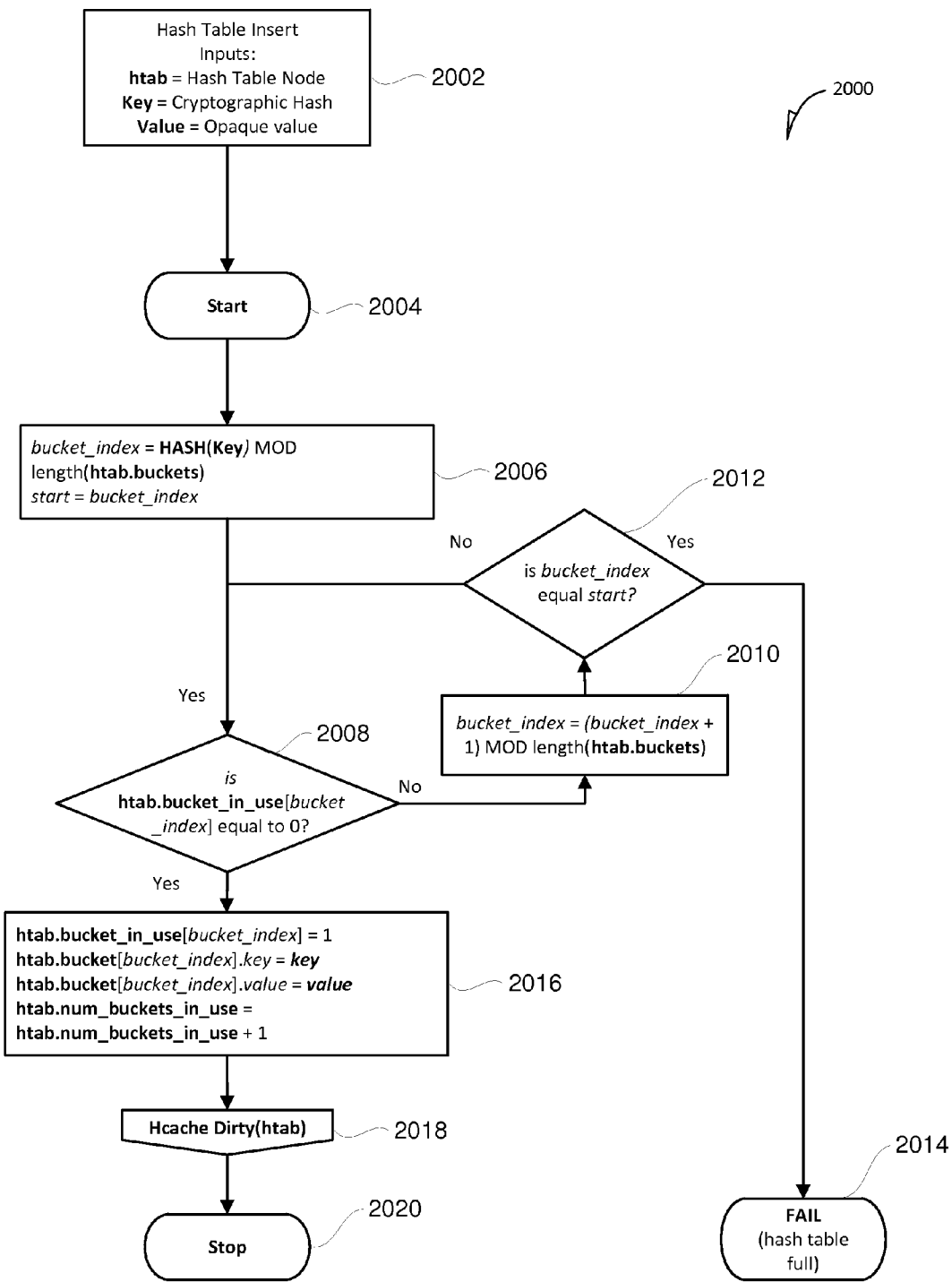
FIG. 20 is a flow chart illustrating inserting a new value for a given key in a hash table.

FIG. 20 is a flow chart illustrating a method 2000 for inserting a new value for a given key in a hash table. The method 2000 may be used when the hash table does not already contain a value for the given key. The method 2000 shows an open addressed hash table with linear probing, but other schemes may also work well. This type of representation makes serializing it to disk/SSD fast and simple, as well as cache efficient while in-RAM.

The keys are cryptographic hashes, which are effectively random numbers, and so they are nicely distributed. Thus, the hash function in operation 2006 uses the cryptographic hash or a subset of the hash, resulting in a very low cost (i.e. fast) hash algorithm (essentially the cost of a single integer remainder operation).

It should be noted that the hash function in operation 2006 should return a slice of the cryptographic hash, truncated to an efficient native size that the computer operates on. For example, it may be a 32 bit number, and when MOD'ed by the number of buckets retains good distribution. The method 2000 is shown by way of example with reference to operations 2002 through 2014.

Figure 21:
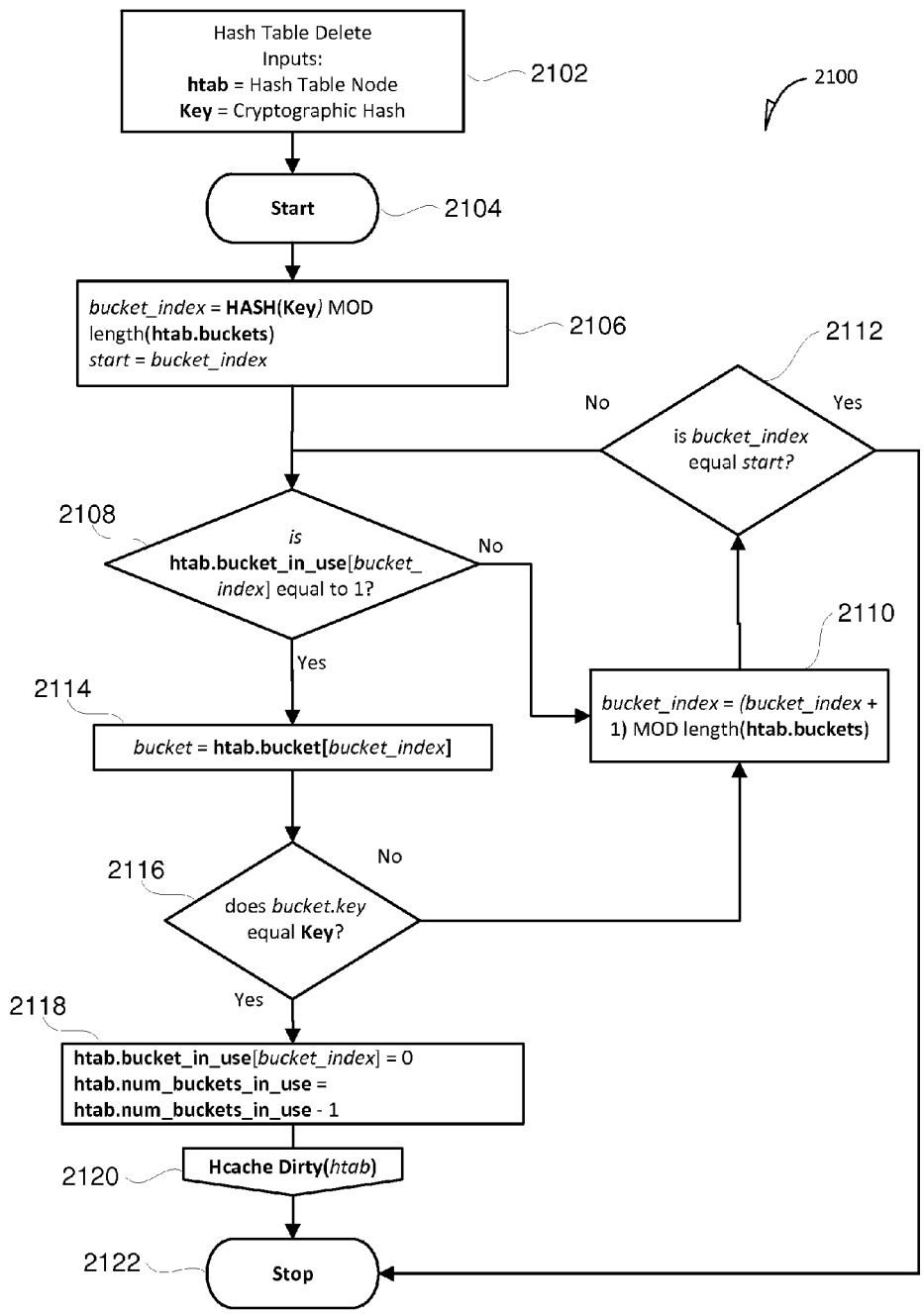
FIG. 21 is a flow chart illustrating deleting a key and the corresponding value from a hash table.

FIG. 21 is a flow chart illustrating a method 2100 for deleting a key and the corresponding value from a hash table. The method 2100 is shown by way of example with reference to operations 2102 through 2122.

Figure 22:
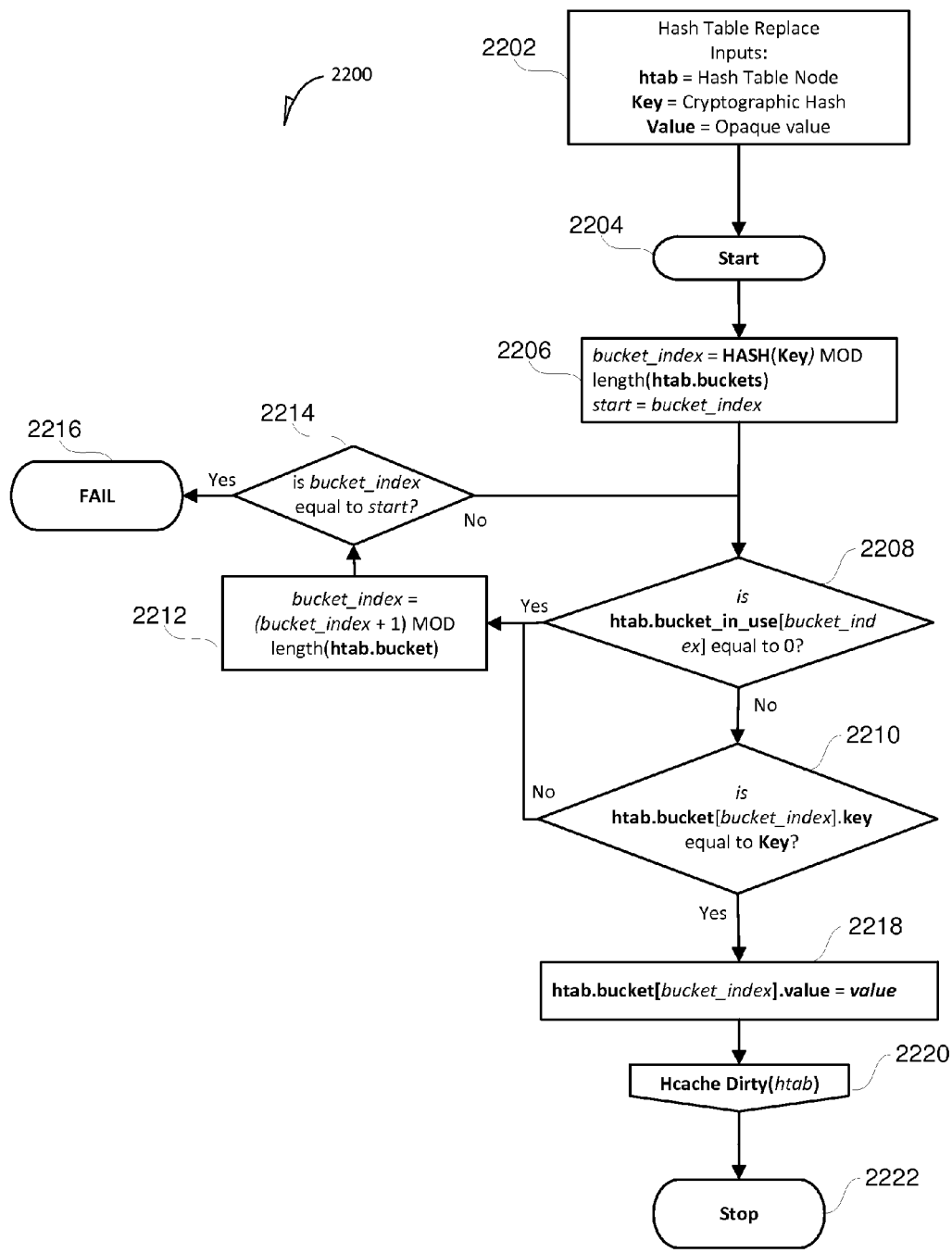
FIG. 22 is a flow chart illustrating replacing an old value with a new value in a hash table.

FIG. 22 is a flow chart illustrating a method 2200 for replacing an old value with a new one in a hash table. Knowing that the hash table already contains an old value for the given key, the method 2200 replaces the old value with the new one. It should be noted that the hash table probing model is similar to inserting a value into a hash table. The method 2200 is shown by way of example with reference to operations 2202 through 2222.

Figure 23:
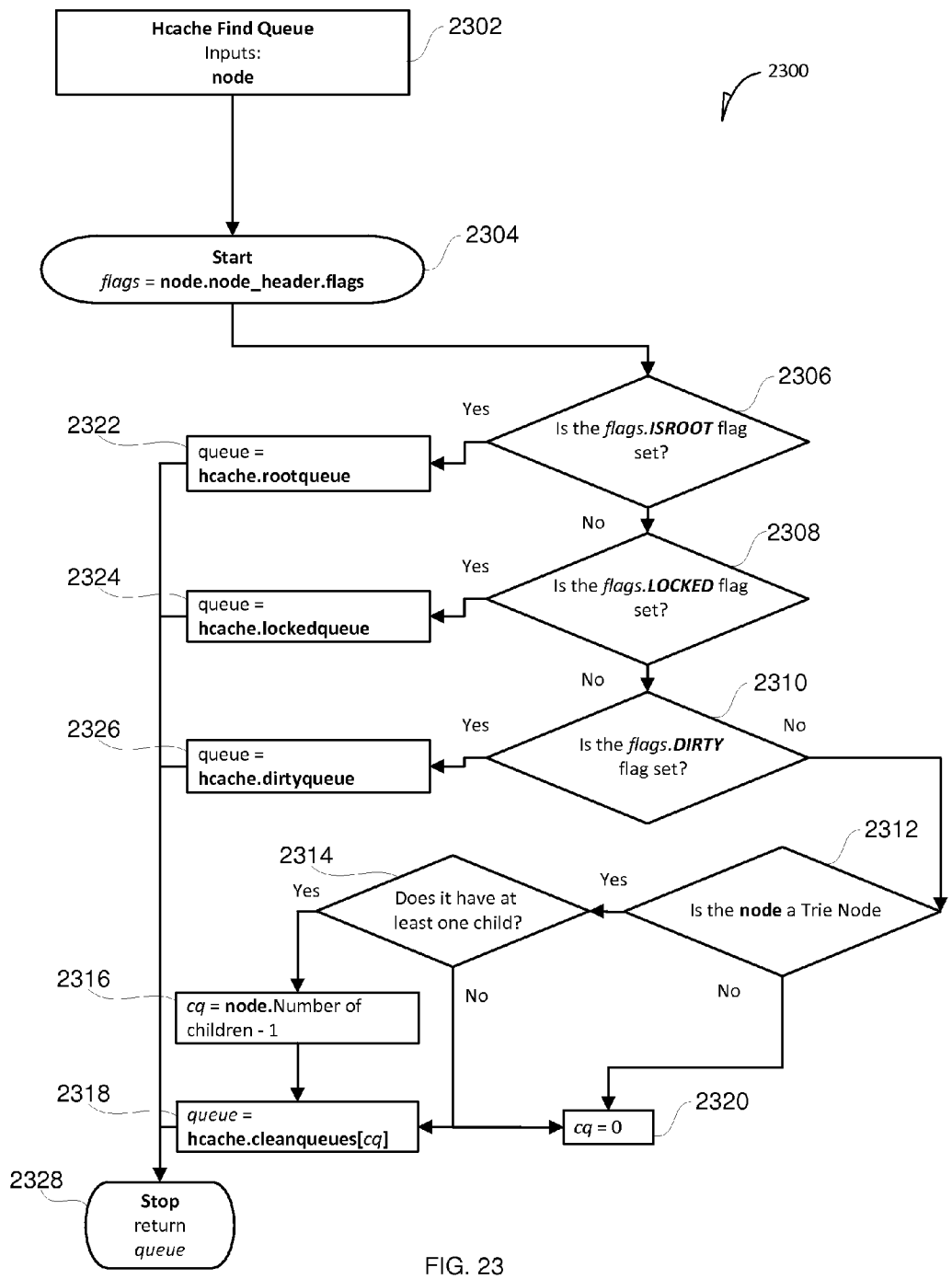
FIG. 23 is a flow chart illustrating determining a cache queue.

FIG. 23 is a flow chart illustrating a method 2300 for finding a cache queue. Clean nodes may be eligible for eviction, however clean nodes that have been accessed recently or have many children are not good candidates for eviction, because evicting a node with children means that the child nodes must also be evicted (otherwise they become unreachable, so there is no reason to spend RAM on them). It should be noted that hash tables will not have any children, and since they are the overwhelming majority of nodes, most evicted nodes will be the hash tables that have not been used in the longest time. Locked nodes are nodes should not be evicted from the cache because they are needed for the current operation. Dirty nodes should not be evicted because they have been changed, but the changes have not yet been written to disk. Root nodes should not be evicted. As all database operations start at the root, it would be an unnecessary waste to evict the root nodes, given that the very next operation will need the root again, but it should be noted that this is simply an optimization, it is not a strict requirement for proper operation.

It should be noted that clean queues is an array of queues, sized such that there is one queue for each possible number of children of a trie node. As an example, 256 children per trie node would result in 256 clean queues. This is not a strict requirement. An equally likely scenario is to batch ranges of numbers of children into more granular buckets. The method 2300 is shown by way of example with reference to operations 2302 through 2328.

Figure 24:
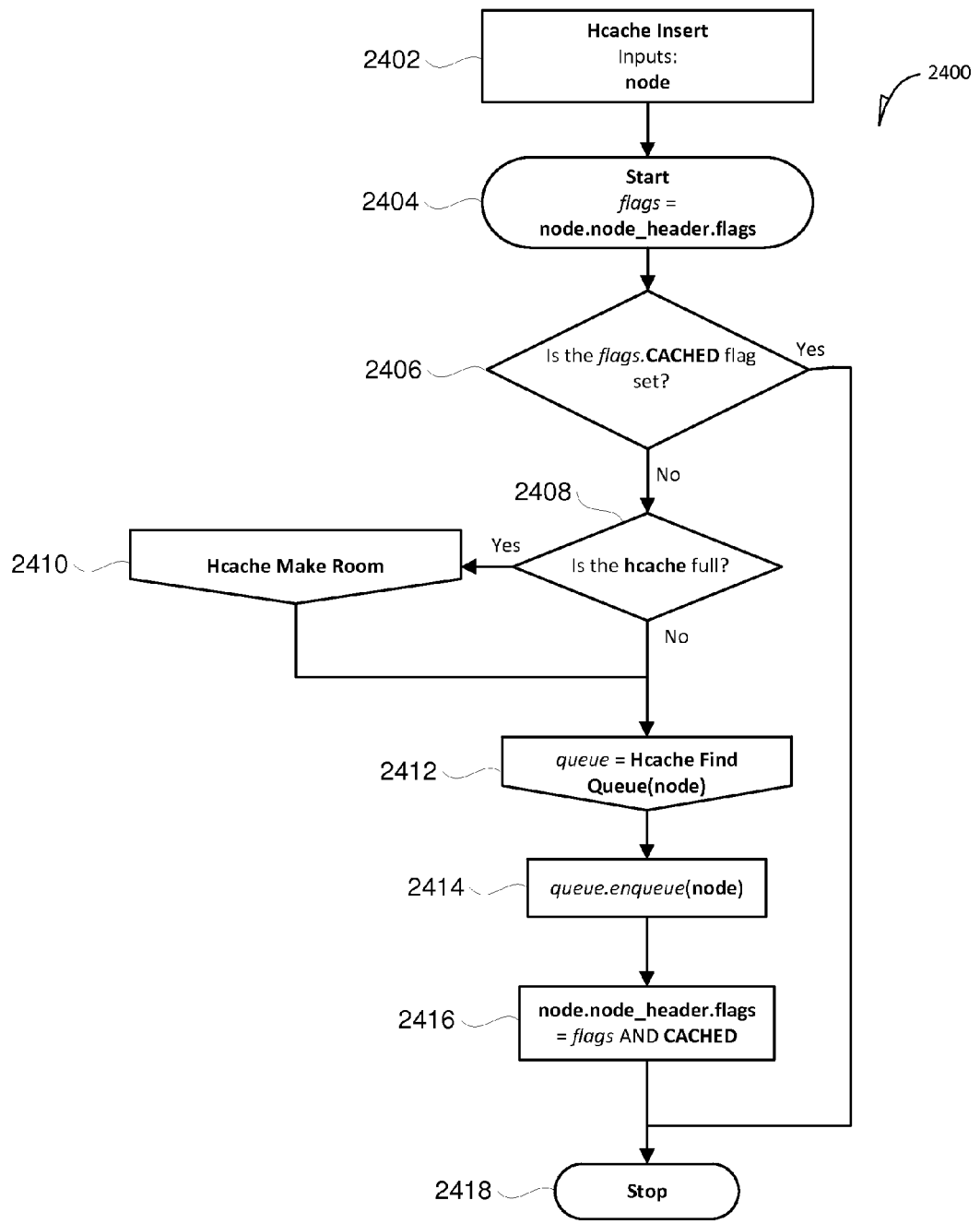
FIG. 24 is a flow chart illustrating inserting a node into a cache.

FIG. 24 is a flow chart illustrating a method 2400 for inserting a node in a cache. The method 2400 places the node given at operation 2402 into the cache, potentially evicting one or more older nodes to make room for it. The method 2400 is shown by way of example with reference to operations 2402 through 2418.

Figure 25:
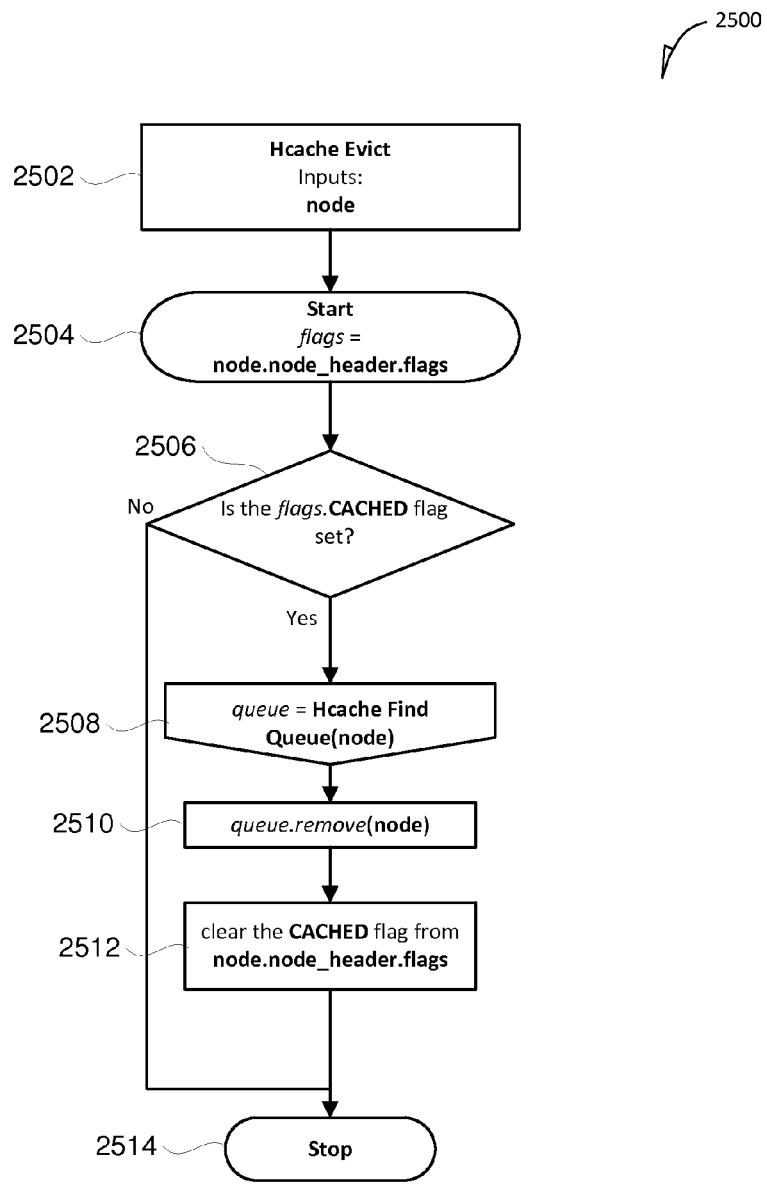
FIG. 25 is a flow chart illustrating evicting a node from a cache.

FIG. 25 is a flow chart illustrating a method 2500 for evicting a node from a cache. The method 2500 is shown by way of example with reference to operations 2502 through 2514.

Figure 26:
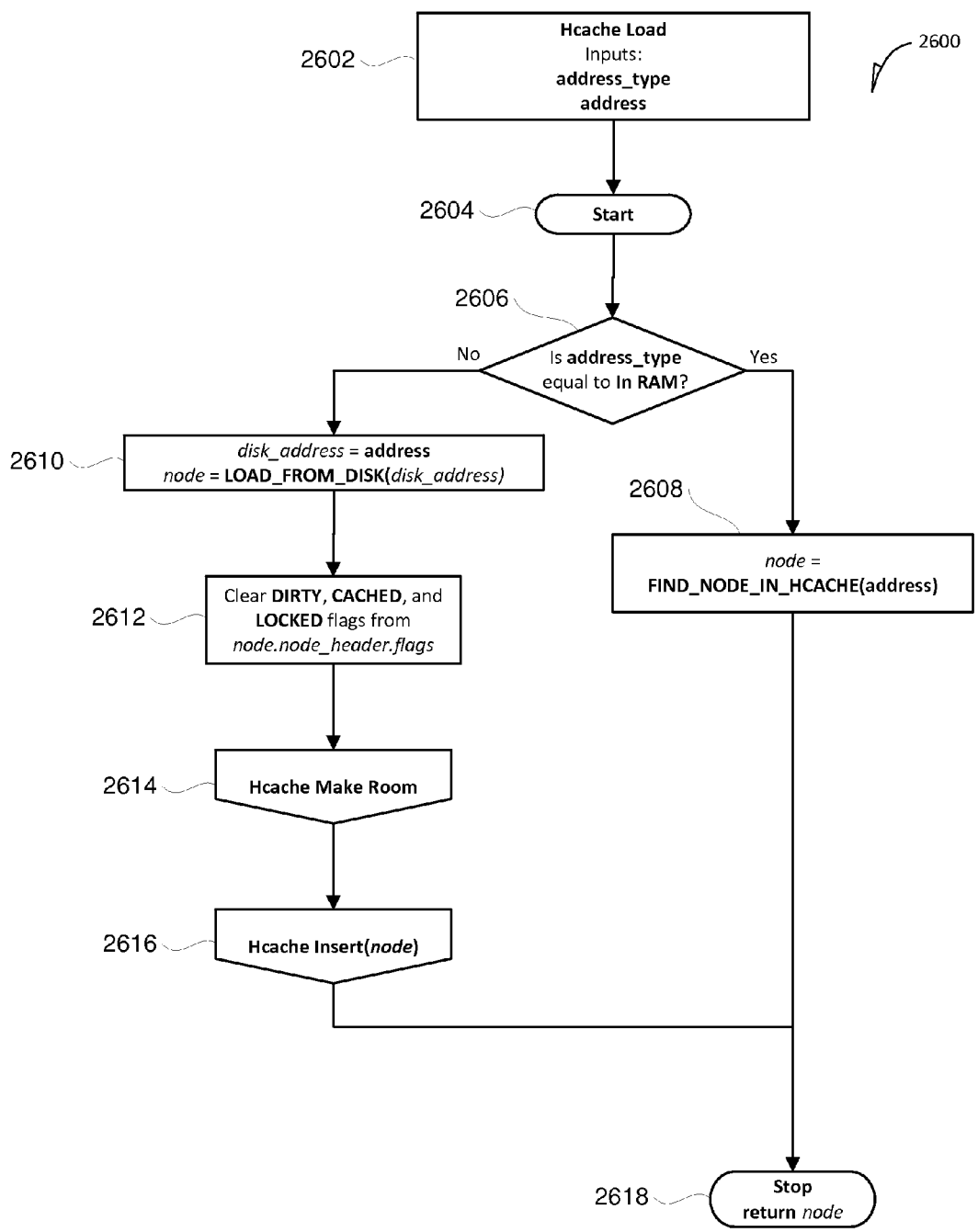
FIG. 26 is a flow chart illustrating loading a node from the disk and adding it to the cache.

FIG. 26 is a flow chart illustrating a method 2600 for loading a node from the disk and adding it to the cache. The method 2600 is shown by way of example with reference to operations 2602 through 2618.

Figure 27:
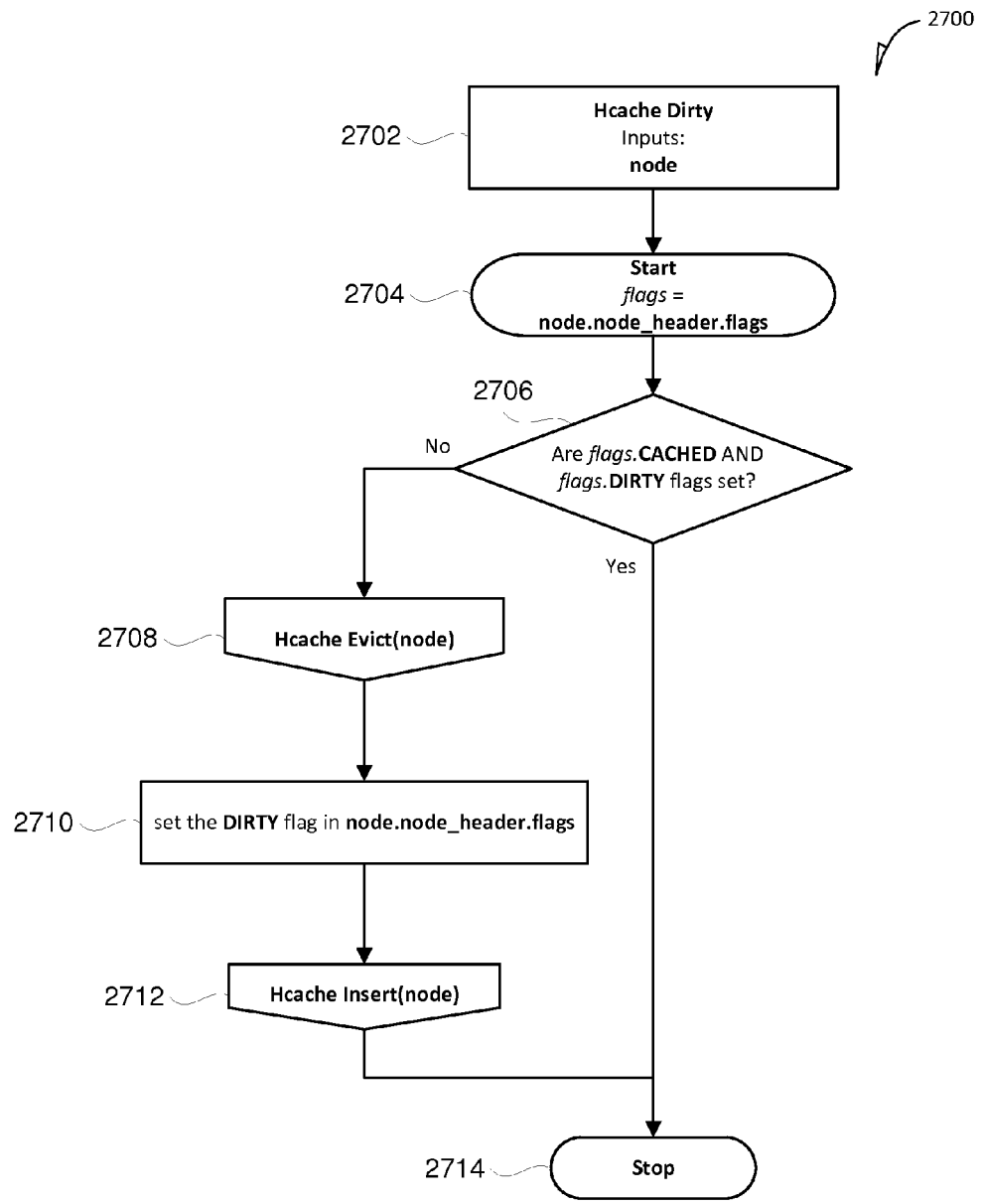
FIG. 27 is a flow chart illustrating a method for marking the node which has been modified, and moving the node from a clean cache to a dirty cache.

FIG. 27 is a flow chart illustrating a method 2700 for marking the node given at operation 2702 as having been modified, and moving it from the clean cache to the dirty cache. The method 2700 is shown by way of example with reference to operations 2702 through 2714.

Figure 28:
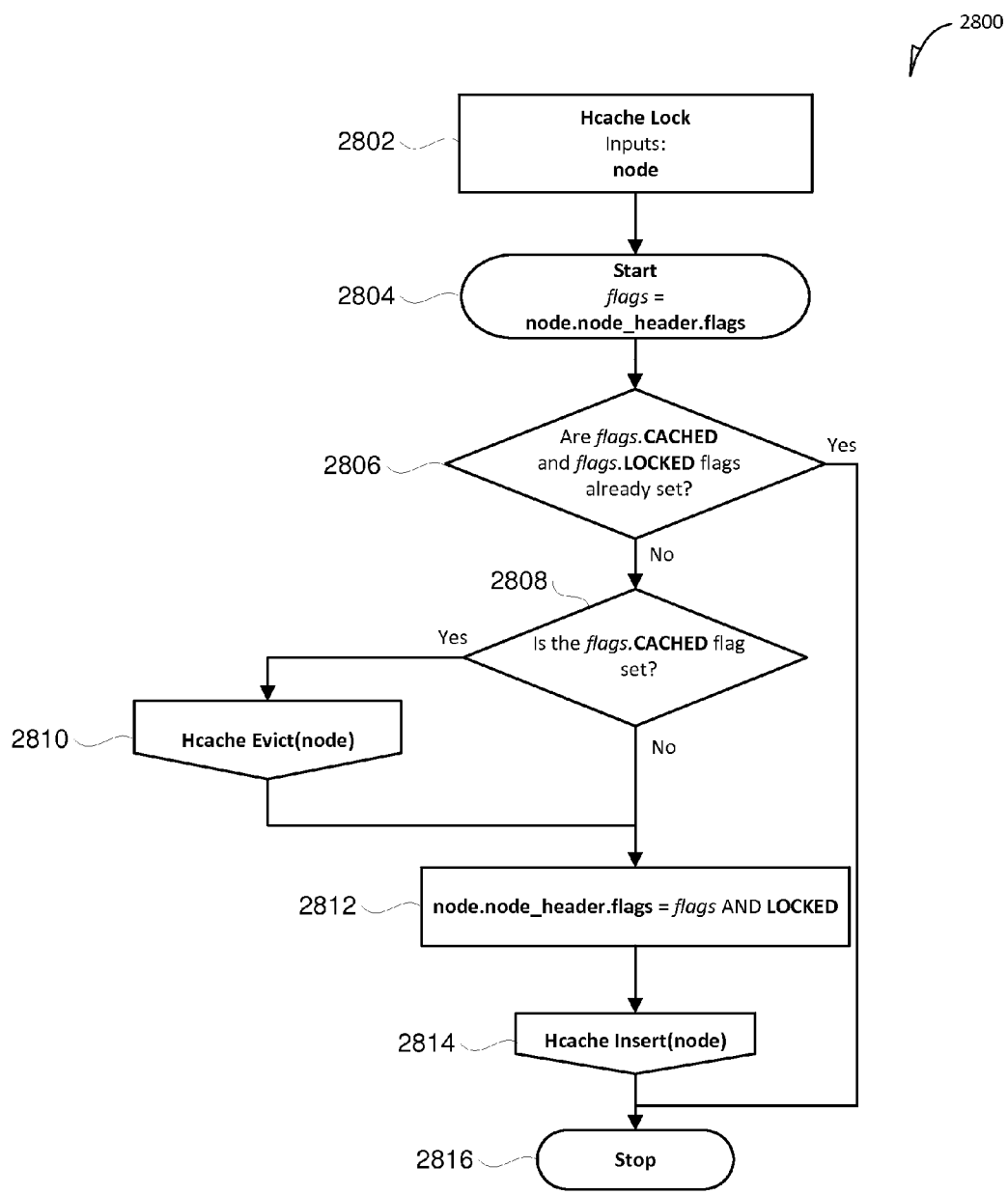
FIG. 28 is a flow chart illustrating marking a node as unable to be evicted by moving the node to the locked cache.

FIG. 28 is a flow chart illustrating a method 2800 for locking a node as unable to be evicted by moving the node to the locked cache. The method 2800 can mark a node as unable to be evicted. Since many database operations operate on more than one node, this ensures that the nodes that are being operated on do not get evicted if more space is needed. The method 2800 is shown by way of example with reference to operations 2802 through 2816.

Figure 29:
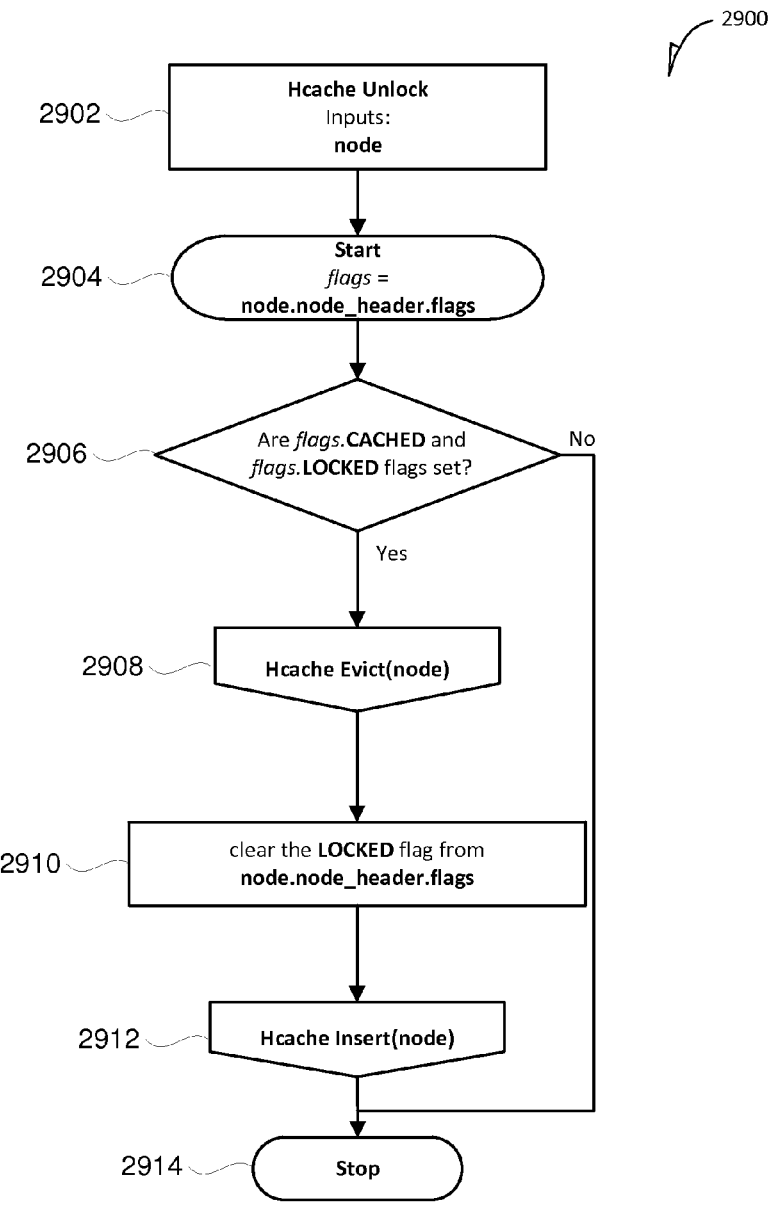
FIG. 29 is a flow chart illustrating unlocking a node by moving it out of the locked cached back to its cache.

FIG. 29 is a flow chart illustrating a method 2900 for unlocking a node by moving it off of the locked cache back onto the appropriate clean cache. The method 2900 may move a node off of the locked cache, back onto whichever cache (root, dirty, or clean) it then belongs on. The method 2900 is shown by way of example with reference to operations 2902 through 2914.

Figure 30:
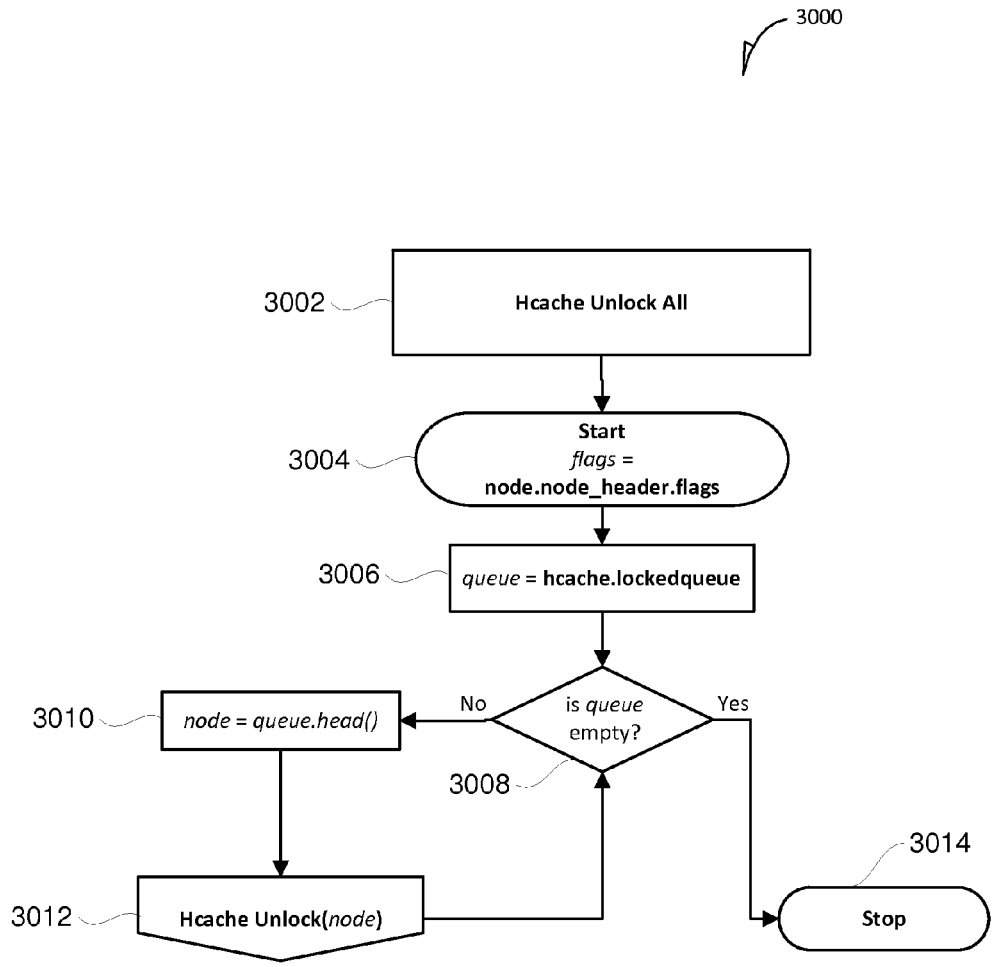
FIG. 30 is a flow chart illustrating moving all nodes of the locked cache back to their respective caches.

FIG. 30 is a flow chart illustrating a method 3000 for moving all nodes of the locked cache back to their respective caches. The method 3000 moves all nodes off of the locked cache, onto whichever cache (root, dirty, or clean they then belong on. The method 3000 is shown by way of example with reference to operations 3002 through 3014.

Figure 31:
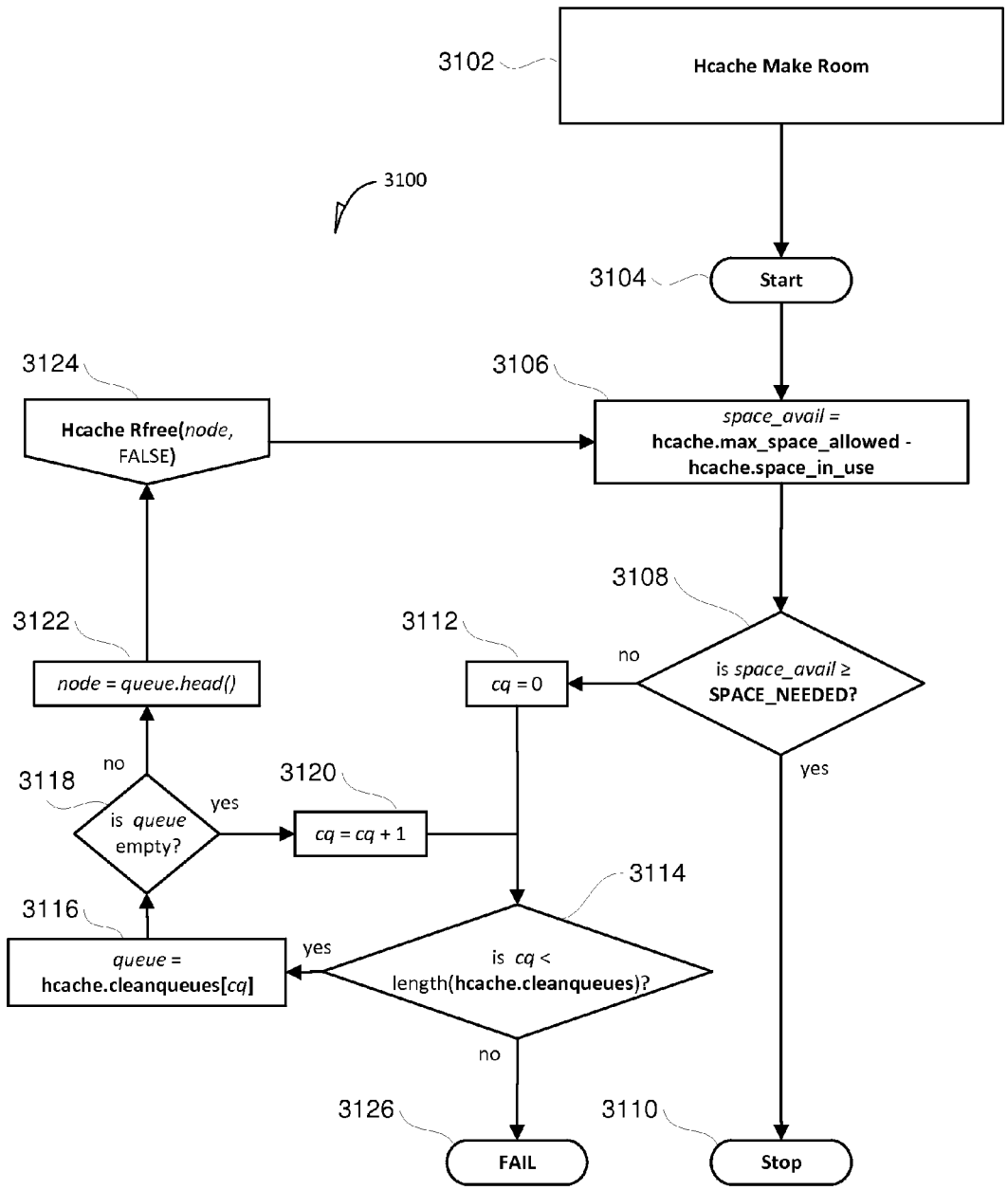
FIG. 31 is a flow chart illustrating making space in the cache for new nodes by removing one or more clean, unlocked, non-root nodes from the cache and returning the associated RAM to the free pool.

FIG. 31 is a flow chart illustrating a method 3100 for making space for new nodes by removing one or more clean, unlocked, non-root nodes from the cache and returning the associated RAM to the free pool. The parameter specifying space needed must be large enough to create space for at least one new node, but can be bigger to create more free space all at once. The method 3100 is shown by way of example with reference to operations 3102 through 3126.

Figure 32:
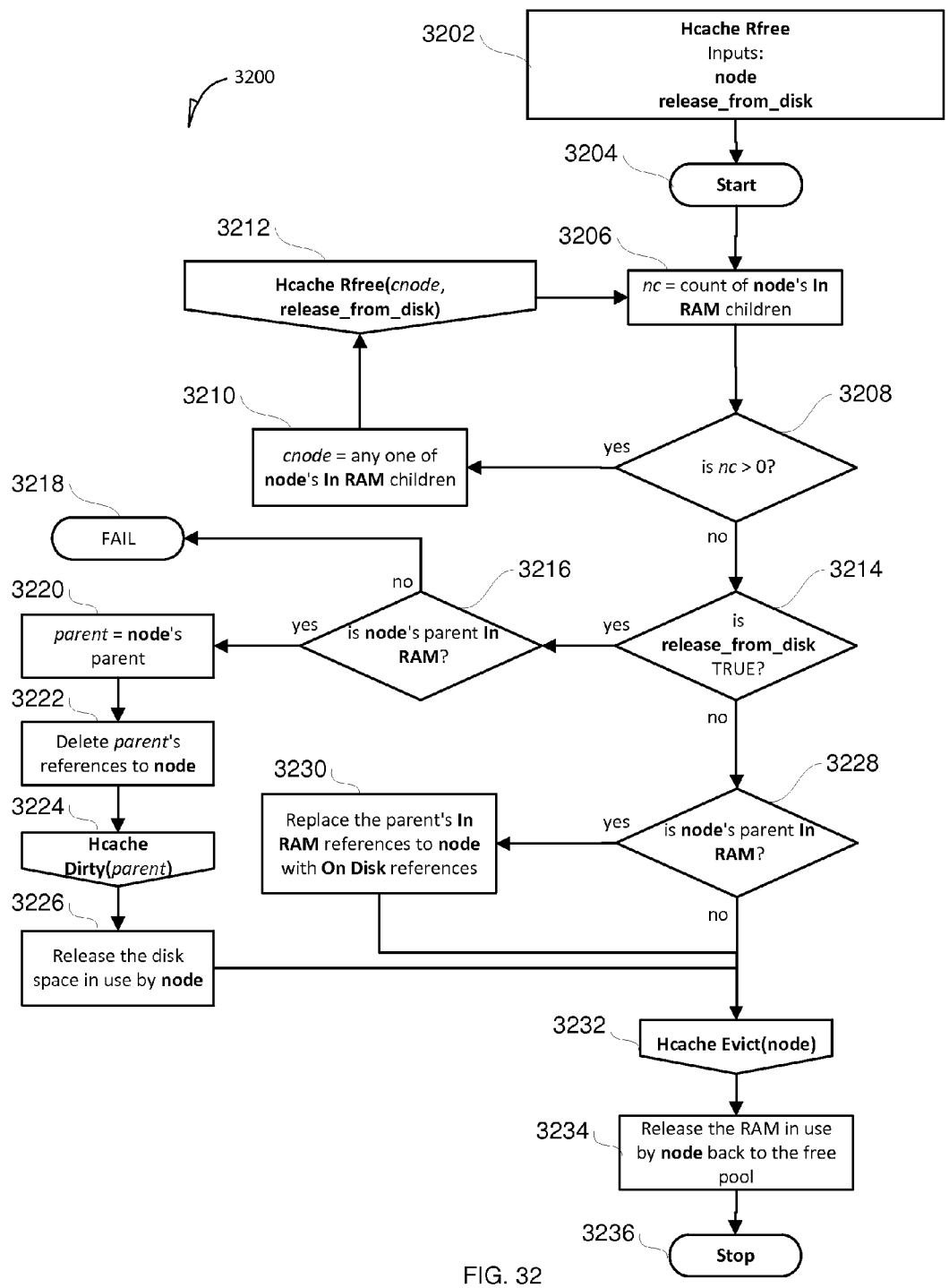
FIG. 32 is a flow chart illustrating recursively removing a given node and all of its children from the cache and returning the RAM to the RAM free pool, and optionally returning the disk space to the disk free pool.

FIG. 32 is a flow chart illustrating a method 3200 for recursively removing from the cache, and optionally entirely removing the node from the database, a given node and all of its children. The method 3200 recursively removes from the cache and free the RAM associated with the given node and all of its children. It should be noted that all nodes should be clean and not locked. It should also be noted that error handling for not meeting this requirement is not shown. If release from the disk is required, the method 3200 may also delete and return the on disk copy to the free pool. The method 3200 is shown by way of example with reference to operations 3202 through 3236.

Figure 33:
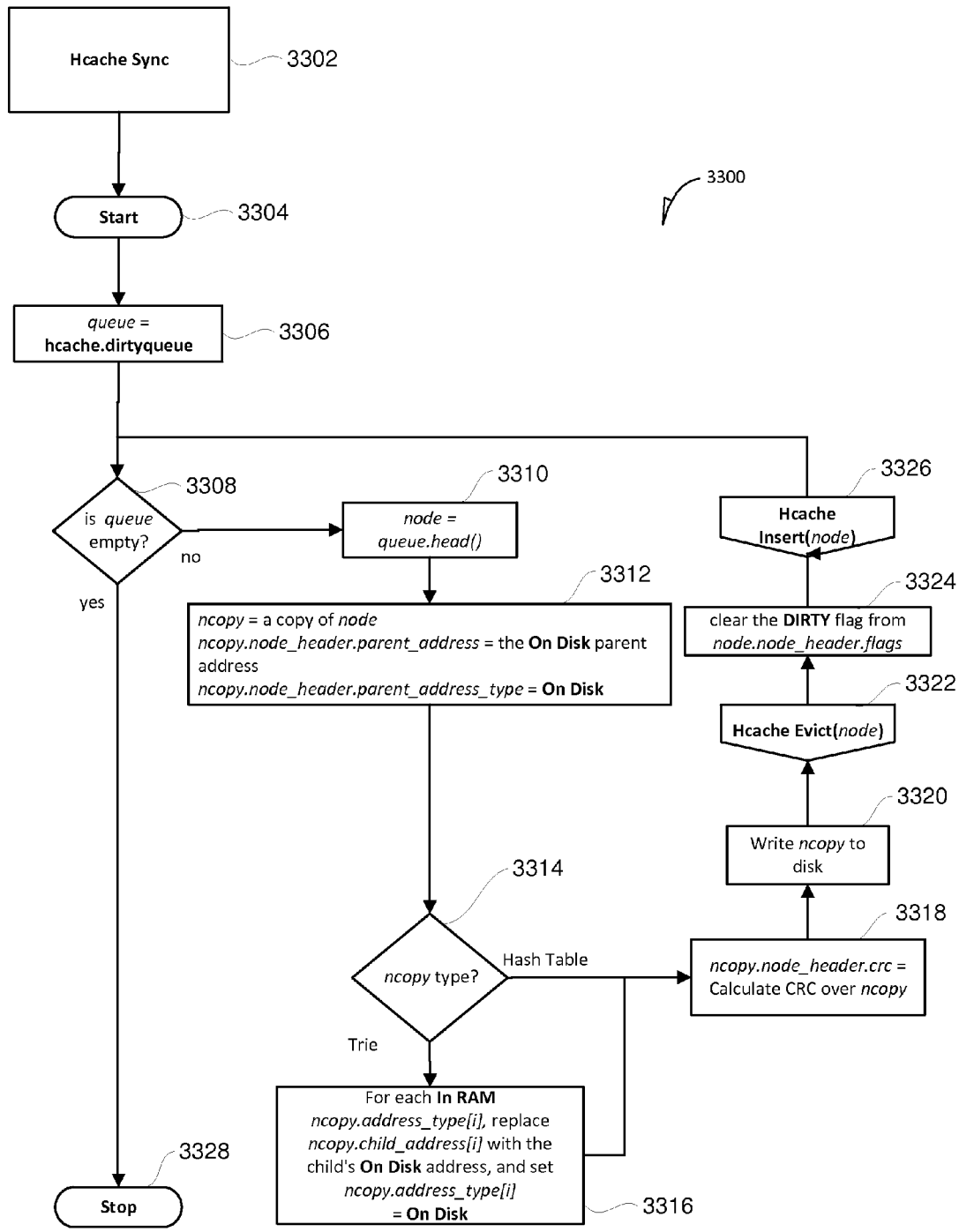
FIG. 33 is a flow chart illustrating writing modified nodes to disk, thereby making clean nodes.

FIG. 33 is a flow chart illustrating a method 3300 for writing modified nodes to disk, thereby making them clean nodes. The method 3300 writes all dirty nodes to disk, turning them into clean nodes in the process. The method 3300 is shown by way of example with reference to operations 3302 through 3328.

Figure 34:
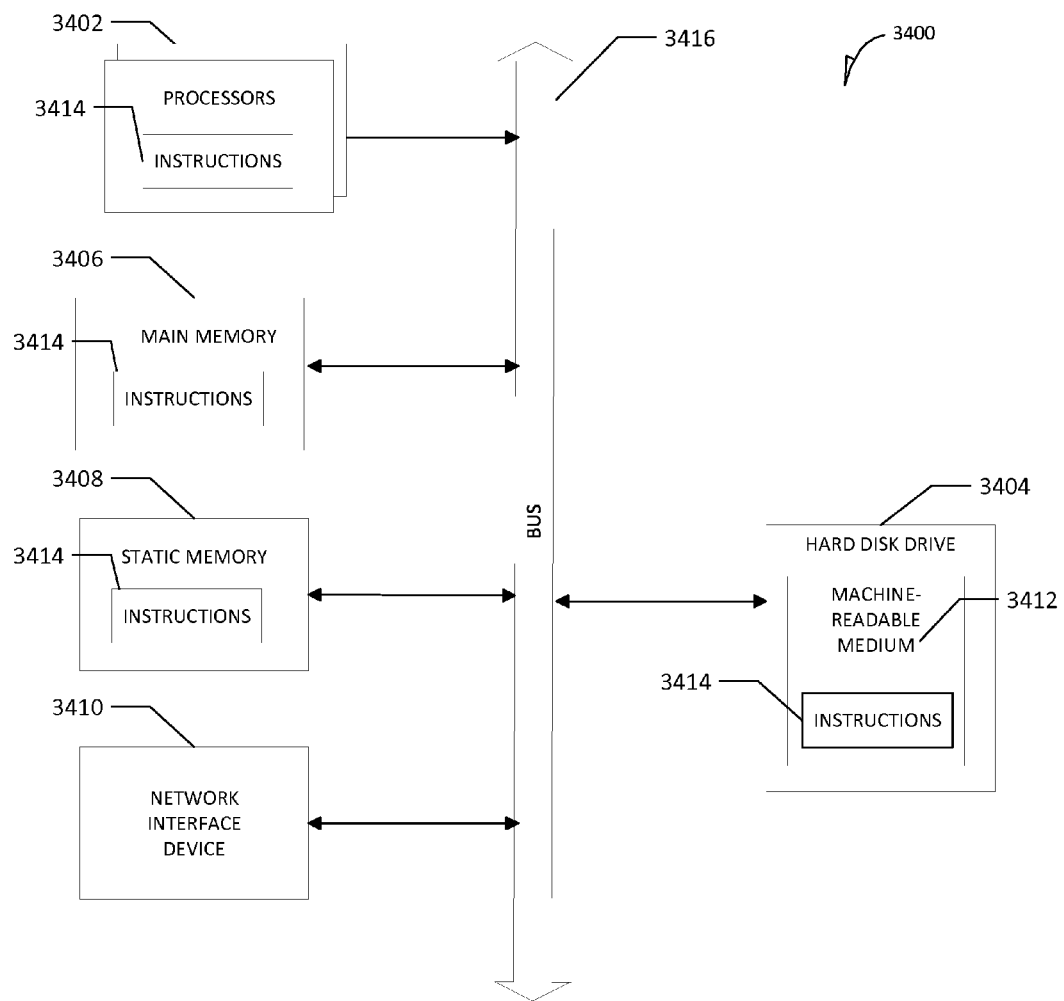
FIG. 34 shows a diagrammatic representation of a computing device for a machine in the example electronic form of a computer system, within which a set of instructions for causing the machine to perform any one or more of the methodologies discussed herein can be executed.

FIG. 34 shows a diagrammatic representation of a computing device for a machine in the example electronic form of a computer system 3400, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a server, a personal computer (PC), a tablet PC, a set-top box (STB), a PDA, a cellular telephone, a digital camera, a portable music player (e.g., a portable hard drive audio device, such as an Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 3400 includes a processor or multiple processors 3402, a hard disk drive 3404, a main memory 3406 and a static memory 3408, which communicate with each other via a bus 3416. The computer system 3400 may also include a network interface device 3410. The hard disk drive 3404 may include a computer-readable medium 3412, which stores one or more sets of instructions 3414 embodying or utilized by any one or more of the methodologies or functions described herein. The instructions 3414 can also reside, completely or at least partially, within the main memory 3406 and/or within the processors 3402 during execution thereof by the computer system 3400. The main memory 3406 and the processors 3402 also constitute machine-readable media.

While the computer-readable medium 3412 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks, random access memory (RAM), read only memory (ROM), and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, C, Go, Python or other compilers, assemblers, interpreters or other computer languages or platforms.

Thus, computer-implemented methods and systems for generating and managing a burst trie-based hierarchical data structure are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A computer-implemented method for bursting a hash table of a key-value database, the method comprising:
    receiving a key and a value associated with the key;
    traversing trie nodes of the key-value database from a root node to a leaf node by recursively dividing the key into a prefix and a suffix, wherein with every iteration, the key is attributed a value associated with the suffix and compared to a value of a current node of the key-value database;
    reaching the leaf node of the key-value database, the leaf node being the hash table, the hash table being a pure hash table reachable by a single prefix, the keys for all key-value pairs stored in the hash table beginning with the single prefix;
    determining that the key is not stored in the hash table;
    determining that the hash table is not able to store the key and the value;
    removing the hash table;
    associating a new trie node with a parent trie node;
    associating two or more new hash tables with the new trie node, one of the two or more new hash tables being able to store the key and the value;
    moving all keys and associated values from the hash table into one of the two or more new hash tables; and
    inserting the key and the associated value into one of the two or more new hash tables.

2. The computer-implemented method of claim 1, further comprising re-associating the removed hash table with the new trie node, and moving away the key-value pairs that belong to a different hash table node.

3. The computer-implemented method of claim 1, wherein each key is a fixed length cryptographic hash.

4. The computer-implemented method of claim 3, wherein the fixed length cryptographic hash is derived using a cryptographic hash function that maximizes chances of each fixed length cryptographic hash value having a unique value.

5. The computer-implemented method of claim 3, wherein the fixed length cryptographic hash is derived using a cryptographic hash function that results in a random distribution of hashes such that there is no obvious grouping of hash values.

6. The computer-implemented method of claim 1, wherein the key is generated by running an encryption algorithm over a plaintext and the value associated with the key provides information describing the plaintext and the value associated with the key includes arbitrary content.

7. The computer-implemented method of claim 1, wherein the key-value database includes one or more of a hash table and a trie node.

8. The computer-implemented method of claim 1, wherein each trie node includes one or more pointers to a further trie node or to a hash table.

9. The computer-implemented method of claim 1, wherein the hash table includes one or more key-value pairs with a common prefix.

10. The computer-implemented method of claim 1, wherein a plurality of key-value databases shares the same underlying permanent storage devices by keeping track of multiple root nodes.

11. The computer-implemented method of claim 10, wherein a number of the multiple root nodes is configured at initialization time.

12. The computer-implemented method of claim 10, wherein one or more of the multiple root nodes can be added at runtime.

13. The computer-implemented method of claim 10, wherein one or more of the multiple root nodes can be deleted at runtime.

14. The computer-implemented method of claim 1, wherein a single key can have multiple values, wherein each value associated with the single key is stored in two or more different key-value databases.

15. The computer-implemented method of claim 1, wherein the key-value database is created within one or more nonvolatile storage devices, thereby allowing an efficient performance when a number of keys exceeds an available Random Access Memory (RAM).

16. The computer-implemented method of claim 15, wherein the one or more nonvolatile storage devices include computer memory that retains stored information without a power source.

17. The computer-implemented method of claim 1, further comprising utilizing an efficient caching method to keep track of memory locations associated with objects of the key-value database.

18. The computer-implemented method of claim 17, wherein the efficient caching method is a Least Recently Used (LRU) caching algorithm.

19. The computer-implemented method of claim 17, wherein the efficient caching method is a Hierarchical LRU caching algorithm.

20. The computer-implemented method of claim 19, wherein the hierarchy associated with the Hierarchical LRU caching algorithm is derived primarily from a number of child nodes and secondarily within each level by the Hierarchical LRU caching algorithm.

21. The computer-implemented method of claim 1, wherein the hash tables are guaranteed a certain minimum amount of cache space, such that trie nodes with one or more child nodes will be evicted before evicting more hash tables.

22. The computer-implemented method of claim 21 wherein the evicting of a trie node causes all of corresponding associated child nodes to also be evicted.

23. The computer-implemented method of claim 1, wherein sizes of records in the hash table are integral multiples of a cache line size.

24. The computer-implemented method of claim 1, wherein sizes of the trie nodes and the hash tables are chosen such that an underlying device will not perform a read-modify-write cycle.

25. The computer-implemented method of claim 1, wherein hash tables of the key-value database are searched using an open addressing model.

26. The computer-implemented method of claim 1, further comprising resolution of hash bucket collisions by one or more of linear probing, quadratic probing, double hashing, or multiple hashing algorithm.

27. The computer-implemented method of claim 26, wherein the double hashing algorithm or the multiple hashing algorithm is used by segmenting a cryptographic hash and using each segment value as a hash table index.

28. The computer-implemented method of claim 1, further comprising choosing a primary hash bucket by taking a prefix of the cryptographic hash that represents a key, treating the prefix as an integer number, and picking the primary hash bucket by taking the remainder when dividing that value by a number of buckets in use.

29. A computer-implemented method for bursting a hash table of a key-value database, the method comprising:
  receiving a key and a value associated with the key;
  traversing trie nodes of the key-value database from a root node to a leaf node by recursively dividing the key into a prefix and a suffix, wherein with every iteration, the key is attributed a value associated with the suffix and compared to a value of a current node of the key-value database;
  reaching the leaf node of the key-value database, the leaf node being the hash table, the hash table being a hybrid hash table reachable by a plurality of prefixes, the keys for all key-value pairs stored in the hash table beginning with the plurality of prefixes;
  determining that the key is not stored in the hash table;
  determining that the hash table is not able to store the key and the value;
  removing the hash table;
  associating a new trie node with a parent trie node;
  associating two or more new hash tables with the new trie node, one of the two or more new hash tables being able to store the key and the value;
  moving all keys and associated values from the hash table into one of the two or more new hash tables; and
  inserting the key and the associated value into one of the two or more new hash tables.

30. The computer-implemented method of claim 29, further comprising re-associating the removed hash table with the new trie node, and moving away the key-value pairs that belong to a different hash table node.

31. The computer-implemented method of claim 29, wherein each key is a fixed length cryptographic hash.

32. The computer-implemented method of claim 31, wherein the fixed length cryptographic hash is derived using a cryptographic hash function that maximizes chances of each fixed length cryptographic hash value having a unique value.

33. The computer-implemented method of claim 31, wherein the fixed length cryptographic hash is derived using a cryptographic hash function that results in a random distribution of hashes such that there is no obvious grouping of hash values.

34. The computer-implemented method of claim 29, wherein the key is generated by running an encryption algorithm over a plaintext and the value associated with the key provides information describing the plaintext and the value associated with the key includes arbitrary content.

35. The computer-implemented method of claim 29, wherein the key-value database includes one or more of a hash table and a trie node.

36. The computer-implemented method of claim 29, wherein each trie node includes one or more pointers to a further trie node or to a hash table.

37. The computer-implemented method of claim 29, wherein the hash table includes one or more key-value pairs with a common prefix.

38. The computer-implemented method of claim 29, wherein a plurality of key-value databases shares the same underlying permanent storage devices by keeping track of multiple root nodes.

39. The computer-implemented method of claim 38, wherein a number of the multiple root nodes is configured at initialization time.

40. The computer-implemented method of claim 38, wherein one or more of the multiple root nodes can be added at runtime.

41. The computer-implemented method of claim 38, wherein one or more of the multiple root nodes can be deleted at runtime.

42. The computer-implemented method of claim 29, wherein a single key can have multiple values, wherein each value associated with the single key is stored in two or more different key-value databases.

43. The computer-implemented method of claim 29, wherein the key-value database is created within one or more nonvolatile storage devices, thereby allowing an efficient performance when a number of keys exceeds an available Random Access Memory (RAM).

44. The computer-implemented method of claim 43, wherein the one or more nonvolatile storage devices include computer memory that retains stored information without a power source.

45. The computer-implemented method of claim 29, further comprising utilizing an efficient caching method to keep track of memory locations associated with objects of the key-value database.

46. The computer-implemented method of claim 45, wherein the efficient caching method is a Least Recently Used (LRU) caching algorithm.

47. The computer-implemented method of claim 45, wherein the efficient caching method is a Hierarchical LRU caching algorithm.

48. The computer-implemented method of claim 47, wherein the hierarchy associated with the Hierarchical LRU caching algorithm is derived primarily from a number of child nodes and secondarily within each level by the Hierarchical LRU caching algorithm.

49. The computer-implemented method of claim 29, wherein the hash tables are guaranteed a certain minimum amount of cache space, such that trie nodes with one or more child nodes will be evicted before evicting more hash tables.

50. The computer-implemented method of claim 49, wherein the evicting of a trie node causes all of corresponding associated child nodes to also be evicted.

51. The computer-implemented method of claim 29, wherein sizes of records in the hash table are integral multiples of a cache line size.

52. The computer-implemented method of claim 29, wherein sizes of the trie nodes and the hash tables are chosen such that an underlying device will not perform a read-modify-write cycle.

53. The computer-implemented method of claim 29, wherein hash tables of the key-value database are searched using an open addressing model.

54. The computer-implemented method of claim 29, further comprising resolution of hash bucket collisions by one or more of linear probing, quadratic probing, double hashing, or multiple hashing algorithm.

55. The computer-implemented method of claim 54, wherein the double hashing algorithm or the multiple hashing algorithm is used by segmenting a cryptographic hash and using each segment value as a hash table index.

56. The computer-implemented method of claim 29, further comprising choosing a primary hash bucket by taking a prefix of the cryptographic hash that represents a key, treating the prefix as an integer number, and picking the primary hash bucket by taking the remainder when dividing that value by a number of buckets in use.

57. A computer-implemented method for bursting a hash table of a key-value database, the method comprising:
receiving a key and a value associated with the key;
traversing trie nodes of the key-value database from a root node to a leaf node by recursively dividing the key into a prefix and a suffix, wherein with every iteration, the key is attributed a value associated with the suffix and compared to a value of a current node of the key-value database;
reaching the leaf node of the key-value database, the leaf node being the hash table, the hash table being a semi-pure hash table reachable by a plurality of prefixes, the keys for all key-value pairs stored in the hash table each beginning with one of the plurality of prefixes;
determining that the key is not stored in the hash table;
determining that the hash table is not able to store the key and the value;
removing the hash table;
associating a new trie node with a parent trie node;
associating two or more new hash tables with the new trie node, one of the two or more new hash tables being able to store the key and the value;
moving all keys and associated values from the hash table into one of the two or more new hash tables; and
inserting the key and the associated value into one of the two or more new hash tables.

58. The computer-implemented method of claim 57, further comprising re-associating the removed hash table with the new trie node, and moving away the key-value pairs that belong to a different hash table node.

59. The computer-implemented method of claim 57, wherein each key is a fixed length cryptographic hash.

60. The computer-implemented method of claim 59, wherein the fixed length cryptographic hash is derived using a cryptographic hash function that maximizes chances of each fixed length cryptographic hash value having a unique value.

61. The computer-implemented method of claim 59, wherein the fixed length cryptographic hash is derived using a cryptographic hash function that results in a random distribution of hashes such that there is no obvious grouping of hash values.

62. The computer-implemented method of claim 57, wherein the key is generated by running an encryption algorithm over a plaintext and the value associated with the key provides information describing the plaintext and the value associated with the key includes arbitrary content.

63. The computer-implemented method of claim 57, wherein the key-value database includes one or more of a hash table and a trie node.

64. The computer-implemented method of claim 57, wherein each trie node includes one or more pointers to a further trie node or to a hash table.

65. The computer-implemented method of claim 57, wherein the hash table includes one or more key-value pairs with a common prefix.

66. The computer-implemented method of claim 57, wherein a plurality of key-value databases shares the same underlying permanent storage devices by keeping track of multiple root nodes.

67. The computer-implemented method of claim 66, wherein a number of the multiple root nodes is configured at initialization time.

68. The computer-implemented method of claim 66, wherein one or more of the multiple root nodes can be added at runtime.

69. The computer-implemented method of claim 66, wherein one or more of the multiple root nodes can be deleted at runtime.

70. The computer-implemented method of claim 57, wherein a single key can have multiple values, wherein each value associated with the single key is stored in two or more different key-value databases.

71. The computer-implemented method of claim 57, wherein the key-value database is created within one or more nonvolatile storage devices, thereby allowing an efficient performance when a number of keys exceeds an available Random Access Memory (RAM).

72. The computer-implemented method of claim 71, wherein the one or more nonvolatile storage devices include computer memory that retains stored information without a power source.

73. The computer-implemented method of claim 57, further comprising utilizing an efficient caching method to keep track of memory locations associated with objects of the key-value database.

74. The computer-implemented method of claim 73, wherein the efficient caching method is a Least Recently Used caching algorithm.

75. The computer-implemented method of claim 73, wherein the efficient caching method is a Hierarchical LRU caching algorithm.

76. The computer-implemented method of claim 75, wherein the hierarchy associated with the Hierarchical LRU caching algorithm is derived primarily from a number of child nodes and secondarily within each level by the Hierarchical LRU caching algorithm.

77. The computer-implemented method of claim 57, wherein the hash tables are guaranteed a certain minimum amount of cache space, such that trie nodes with one or more child nodes will be evicted before evicting more hash tables.

78. The computer-implemented method of claim 77, wherein the evicting of a trie node causes all of corresponding associated child nodes to also be evicted.

79. The computer-implemented method of claim 57, wherein sizes of records in the hash table are integral multiples of a cache line size.

80. The computer-implemented method of claim 57, wherein sizes of the trie nodes and the hash tables are chosen such that an underlying device will not perform a read-modify-write cycle.

81. The computer-implemented method of claim 57, wherein hash tables of the key-value database are searched using an open addressing model.

82. The computer-implemented method of claim 57, further comprising resolution of hash bucket collisions by one or more of linear probing, quadratic probing, double hashing, or multiple hashing algorithm.

83. The computer-implemented method of claim 82, wherein the double hashing algorithm or the multiple hashing algorithm is used by segmenting a cryptographic hash and using each segment value as a hash table index.

84. The computer-implemented method of claim 57, further comprising choosing a primary hash bucket by taking a prefix of the cryptographic hash that represents a key, treating the prefix as an integer number, and picking the primary hash bucket by taking the remainder when dividing that value by a number of buckets in use.

* * * * *